US009792824B2

(12) United States Patent
Ikeda

(10) Patent No.: US 9,792,824 B2
(45) Date of Patent: Oct. 17, 2017

(54) IMAGE FORMING APPARATUS, AND METHOD AND PROGRAM FOR CONTROLLING THE SAME

(71) Applicant: CANON KABUSHIKI KAISHA, Tokyo (JP)

(72) Inventor: Toru Ikeda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 221 days.

(21) Appl. No.: 14/553,908

(22) Filed: Nov. 25, 2014

(65) Prior Publication Data

US 2015/0154877 A1 Jun. 4, 2015

(30) Foreign Application Priority Data

Nov. 29, 2013 (JP) ................. 2013-248033

(51) Int. Cl.
  *H04N 5/765* (2006.01)
  *G09B 5/02* (2006.01)
  *H04N 1/00* (2006.01)
  *G09B 19/00* (2006.01)

(52) U.S. Cl.
  CPC ............ *G09B 5/02* (2013.01); *G09B 19/00* (2013.01); *H04N 1/00015* (2013.01); *H04N 1/00037* (2013.01); *H04N 1/00076* (2013.01); *H04N 1/00408* (2013.01); *H04N 2201/0094* (2013.01)

(58) Field of Classification Search
  CPC ... G09B 5/02; G09B 19/00; H04N 2201/0094
  USPC ........................................... 386/200
  See application file for complete search history.

(56) References Cited

U.S. PATENT DOCUMENTS

| 6,744,998 | B2 | 6/2004 | McIntyre | |
|---|---|---|---|---|
| 2004/0057743 | A1* | 3/2004 | McIntyre | ........... G03G 15/5016 399/81 |
| 2014/0267326 | A1* | 9/2014 | Stanley | .................... G06F 3/14 345/522 |

FOREIGN PATENT DOCUMENTS

| CN | 101051369 A | 10/2007 |
|---|---|---|
| CN | 102096364 A | 6/2011 |
| CN | 102447840 A | 5/2012 |
| CN | 103389874 A | 11/2013 |
| JP | 2008-282217 A | 11/2008 |
| JP | 2010-74524 A | 4/2010 |
| JP | 04666037 B2 | 4/2011 |

* cited by examiner

*Primary Examiner* — Hung Dang
*Assistant Examiner* — Girumsew Wendmagegn
(74) *Attorney, Agent, or Firm* — Canon USA, Inc., IP Division

(57) ABSTRACT

An image forming apparatus plays a movie representing operation procedures to be performed to make maintenance on the image forming apparatus. In a case where start of a job is detected and an operation by a user is detected, the image forming apparatus plays the movie of which frame rate is lowered.

20 Claims, 23 Drawing Sheets

| MAINTENANCE ID | MOVIE LIST |
|---|---|
| 001 | A1, A2, A4 |
| 002 | A1, A3, A4 |
| 003 | A1, A2, A3, A4 |
| 004 | B1, B2, B3, B4, B14 |
| 005 | B1, B5, B6, B7, B14 |
| 006 | B1, B8, B9, B10, B14 |
| 007 | B1, B11, B12, B13, B14 |

FIG. 4B

| MOVIE ID | MOVIE FILE | PLAY TIME | COVER OPEN/CLOSE FLAG | MESSAGE | ILLUSTRATION FILE |
|---|---|---|---|---|---|
| A1 | /movie/A1.mpeg | 0:10 | 0 | OPEN RIGHT-HAND COVER | /image/A1.png |
| A2 | /movie/A2.mpeg | 0:30 | 1 | REMOTE PAPER FROM CONVEY PATH | /image/A2.png |
| A3 | /movie/A3.mpeg | 0:40 | 1 | REMOTE PAPER FROM DUPLEX UNIT | /image/A3.png |
| A4 | /movie/A4.mpeg | 0:20 | 1 | CLOSE RIGHT-HAND COVER | /image/A4.png |
| B1 | /movie/B1.mpeg | 0:10 | 0 | OPEN FRONT COVER | /image/B1.png |
| B2 | /movie/B2.mpeg | 0:20 | 1 | REMOVE EMPTY MAGENTA TONER CARTRIDGE | /image/B2.png |
| B3 | /movie/B3.mpeg | 0:40 | 1 | PREPARE NEW MAGENTA TONER CARTRIDGE | /image/B3.png |
| B4 | /movie/B4.mpeg | 0:30 | 1 | INSTALL NEW MAGENTA TONER CARTRIDGE | /image/B4.png |
| B5 | /movie/B5.mpeg | 0:20 | 1 | REMOVE EMPTY CYAN TONER CARTRIDGE | /image/B5.png |
| B6 | /movie/B6.mpeg | 0:40 | 1 | PREPARE NEW CYAN TONER CARTRIDGE | /image/B6.png |
| B7 | /movie/B7.mpeg | 0:30 | 1 | INSTALL NEW CYAN TONER CARTRIDGE | /image/B7.png |
| B8 | /movie/B8.mpeg | 0:20 | 1 | REMOVE EMPTY YELLOW TONER CARTRIDGE | /image/B8.png |
| B9 | /movie/B9.mpeg | 0:40 | 1 | PREPARE NEW YELLOW TONER CARTRIDGE | /image/B9.png |
| B10 | /movie/B10.mpeg | 0:30 | 1 | INSTALL NEW YELLOW TONER CARTRIDGE | /image/B10.png |
| B11 | /movie/B11.mpeg | 0:20 | 1 | REMOVE EMPTY BLACK TONER CARTRIDGE | /image/B11.png |
| B12 | /movie/B12.mpeg | 0:40 | 1 | PREPARE NEW BLACK TONER CARTRIDGE | /image/B12.png |
| B13 | /movie/B13.mpeg | 0:30 | 1 | INSTALL NEW BLACK TONER CARTRIDGE | /image/B13.png |
| B14 | /movie/B14.mpeg | 0:20 | 1 | CLOSE FRONT COVER | /image/B14.png |

IMAGE FORMING APPARATUS, AND METHOD AND PROGRAM FOR CONTROLLING THE SAME

BACKGROUND OF THE INVENTION

Field of the Invention

The present invention relates to a method of displaying a procedure of making maintenance on an image forming apparatus.

Description of the Related Art

An image forming apparatus capable of playing a movie to present a maintenance procedure has been proposed as to solving a paper jam, exchanging a toner cartridge, replenishing staples and the like (Japanese Patent Laid-Open No. 2008-282217). This technique is intended to make efficient use of high power of expression and a large amount of information provided by a movie thereby making it possible for a user to more easily make maintenance on the image forming apparatus.

On the other hand, in a case where a job such as a scan process is started when the movie for presenting maintenance procedure is being displayed, a processing load of CPU is increased because of the process of the job, so update of the frame rate of the movie and/or execution of the job may be delayed. To solve the above-described issue, Japanese Patent Laid-Open No. 2010-74524 discloses that in a case where the job is started when the movie for presenting maintenance procedure is being displayed, a number of frames to be updated per second (hereinafter called "frame rate") is lowered and the processing load of the CPU is decreased.

However, in Japanese Patent Laid-Open No. 2010-74524, the frame rate of the movie is lowered at the timing of start of the job, so a movie viewed by a user is to be played at low frame rate suddenly and it may give the user a feeling of strangeness.

SUMMARY OF THE INVENTION

According to an aspect of the invention, an apparatus for playing a plurality of sub-movies sequentially as a single movie, the sub-movies respectively representing operation procedures to be performed to make maintenance on the apparatus includes a first playing unit configured to play the movie using a first frame rate, a second playing unit configured to play the movie using a second frame rate which is lower than the first frame rate, a discrimination unit configured to discriminate a job execution status, and a control unit configured to control, when an instruction for playing the movie is issued after the playing of the movie by the first playing unit or after the second playing unit is paused, to switch between playing the movie by the first playing unit and playing the movie by the second playing unit based on the discriminated job execution status.

Further features of the present invention will become apparent from the following description of exemplary embodiments (with reference to the attached drawings).

BRIEF DESCRIPTION OF THE DRAWINGS

FIGS. 4A and 4B are data structure diagrams defining relations between maintenance events and movies according to an embodiment.

DESCRIPTION OF THE EMBODIMENTS

First Embodiment

A first embodiment is described below with reference to drawings.

Figure 1:
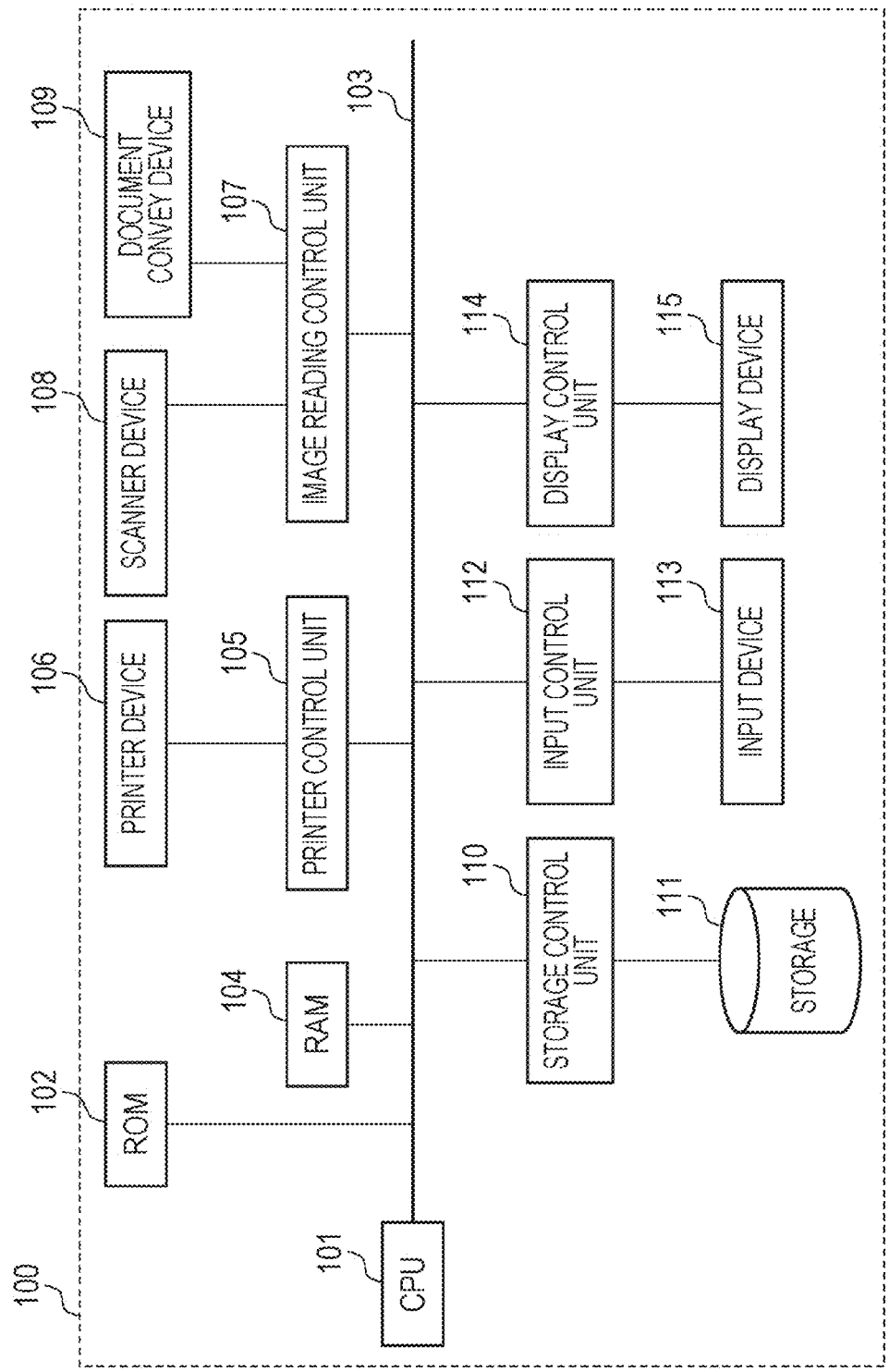
FIG. 1 is a block diagram illustrating a hardware configuration of an image processing apparatus according to an embodiment.

FIG. 1 is a block diagram illustrating a configuration of an image forming apparatus 100, which may be a multifunction printer or the like, according to the first embodiment.

As illustrated in FIG. 1, the image forming apparatus 100 includes a CPU 101, a ROM 102, a RAM 104, a printer control unit 105, an image reading control unit 107, a storage control unit 110, an input control unit 112, and a display control unit 114, which are connected to each other via a bus 103.

The image forming apparatus 100 also includes a storage 111, a printer device 106, a scanner device 108, a document feeding device 109, an input device 113, and a display device 115.

The CPU 101 performs controlling over the image forming apparatus 100. The CPU 101 starts an operating system (OS) using a boot program stored in the ROM 102. On this OS, the CPU 101 executes a program stored in the storage 111. The RAM 104 is used by the CPU 101 as a main memory or a temporary storage area such as a work area. When the CPU 101 executes a program, the CPU 101 reads out the program from the storage 111 and loads it into the RAM 104.

The printer control unit 105 controls the printer device 106 to print image data on a printing sheet such as paper based on a print job. In other words, the printer device 106 is a device configured to print image data on a printing sheet.

The image reading control unit 107 controls the scanner device 108 to generate image data based on a scan job. The image reading control unit 107 also controls the document feeding device 109, which may be an auto document feeder (ADF) or the like, to feed documents one by one from a document plate of the document feeding device 109 to the scanner device 108 to generate image data. The scanner device 108 scans a document using an optical reading device such as a CCD and convers image information on the document into electric signal data.

The printer control unit 105 and the image reading control unit 107 may be integrally configured and controls the printer device 106, the scanner device 108, and the document feeding device 109 may be controlled The storage 111 is a readable and writable nonvolatile storage apparatus such as a HDD. The storage 111 stores a program for controlling the image forming apparatus 100, various application programs, and various kinds of data such as movie data for presenting maintenance procedures. The programs are executed by the CPU 101. The storage control unit 110 controls the storage 111.

The input control unit 112 accepts an operation command issued by a user via the input device 113, which may be a touch panel, a hard key, or the like. The display control unit 114 controls the display device 115, which may be a LCD, a CRT, or the like, to present an operation screen, a movie, or the like to a user.

Figure 2:
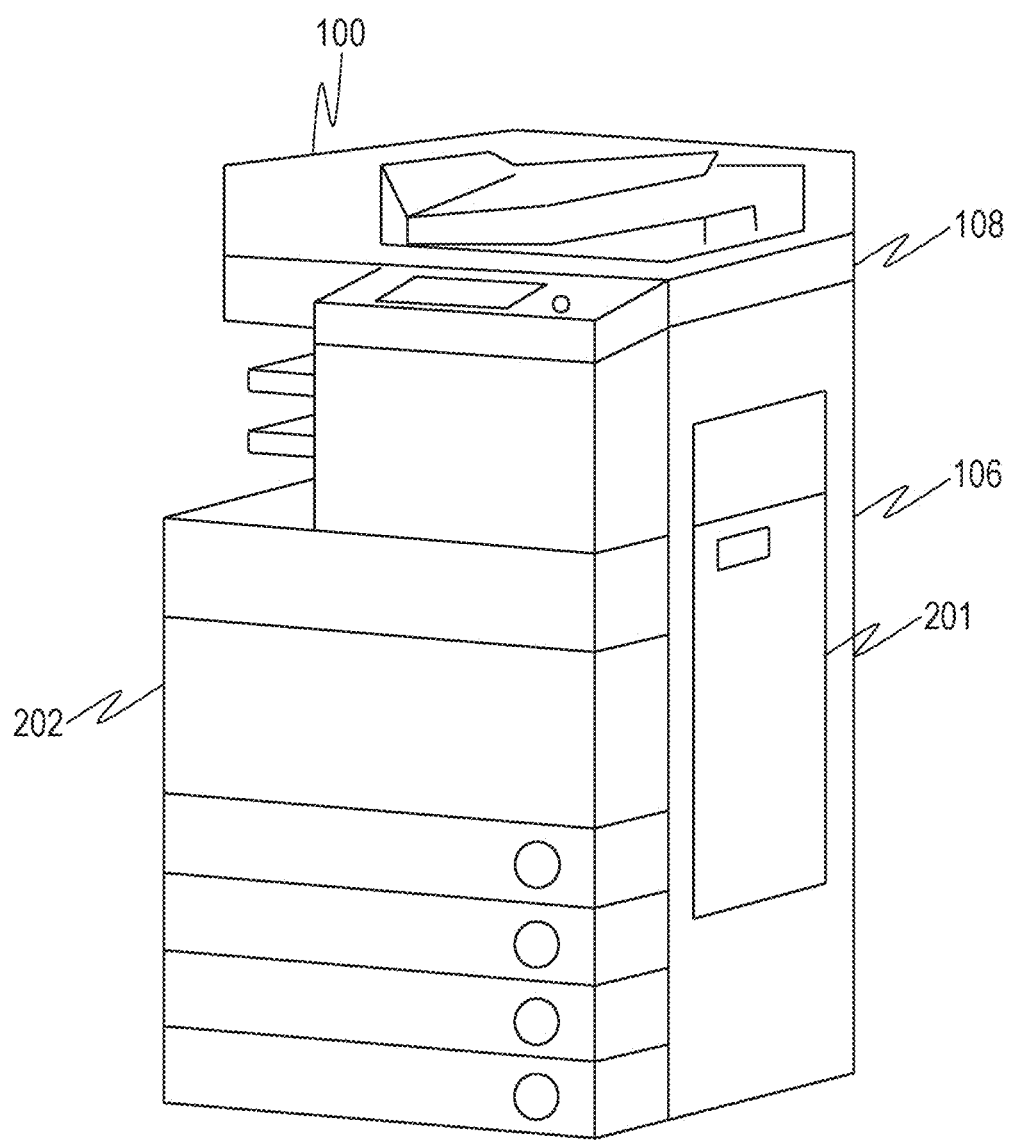
FIG. 2 is a diagram illustrating an external appearance of an image forming apparatus according to an embodiment.

FIG. 2 illustrates an external appearance of the image forming apparatus 100.

The image forming apparatus 100 has a right-hand cover 201 and a toner cover 202 as illustrated in FIG. 2.

The right-hand cover 201 is used to expose a conveying path of printing paper to remove a jammed paper when a paper jam occurs. The toner cover 202 is used to expose a region in which toner containers are disposed when toner is exchanged. The image forming apparatus 100 has sensors for detecting whether the right-hand cover 201 and the toner cover 202 are respectively in open or closed states.

Figure 3:
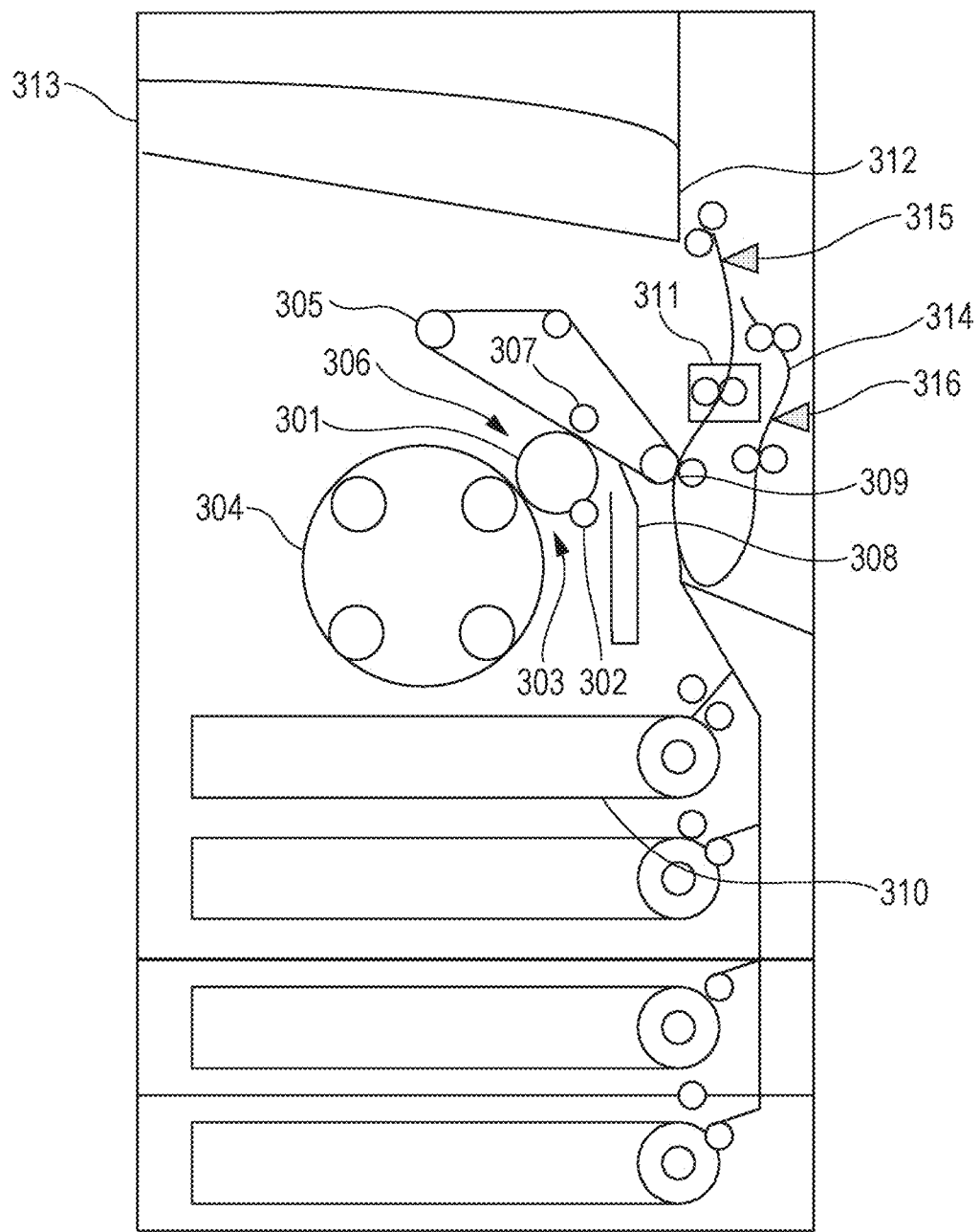
FIG. 3 is a cross-sectional view illustrating an internal structure of an image forming apparatus according to an embodiment.

FIG. 3 is a cross-sectional view illustrating an internal structure of the image forming apparatus 100. Note that the internal structure illustrated in FIG. 3 may be employed, for example, for a CMYK (cyan, magenta, yellow, black) full color image forming apparatus.

A photosensitive drum 301 is charged by a primary charger 302 to a particular electric potential with a particular polarity, and a part thereof denoted by reference numeral 303 is exposed by a not-illustrated exposure unit under the control of the CPU 101. In this manner, an electrostatic latent image corresponding to, for example, K(black) is formed.

A rotary developing unit 304 includes four developing units each integrated with a toner cartridge. After the electrostatic latent image is formed, an image corresponding to K is developed on the photosensitive drum 301 by one of the developing units of the rotary developing unit 304.

An intermediate transfer belt 305 is driven to move in a direction represented by 306 such that the image corresponding to K developed on the photosensitive drum 301 is transferred to the intermediate transfer belt 305 by an electric field formed by a first transfer roller 307 when the intermediate transfer belt 305 comes into contact with the photosensitive drum 301. After the image is transferred to the intermediate transfer belt, the surface of the photosensitive drum 301 is cleaned by a cleaning unit 308. The above process is sequentially repeated such that images of four colors (magenta, cyan, yellow, and black) are superimposed on the intermediate transfer belt and thus a color image is formed as a result. Note that in a case where a single-color image is formed, the transfer process is performed only once.

The image transferred to the intermediate transfer belt 305 is printed, by a second transfer roller 309, on printing paper fed from a cassette 310. The printing paper with the image printed thereon is heated by a fixing unit 311 to fix the image. After the fixing, the paper is conveyed by a roller 312 to a paper discharge opening 313 and is output to the outside of the image forming apparatus. In a case where duplex printing is performed, the paper returned passing through a returning path 314 and the printing process is repeated.

A paper discharge unit sensor 315 and a duplex unit sensor 316 are disposed for detecting whether paper is jammed or not. In other words, an occurrence of a paper jam is detected using these sensors. These sensors may be those using a mechanical flag or those using an optical device.

Figure 4A:
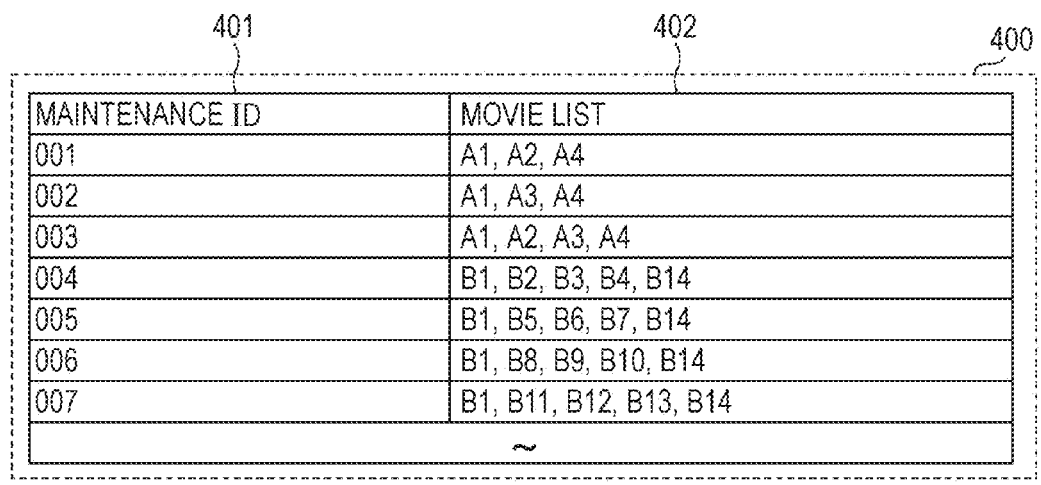

FIG. 4A illustrates a movie list table 400, and FIG. 4B illustrates a movie table 410, both stored in the storage 111 illustrated in FIG. 1.

As illustrated in FIG. 4A, the movie list table 400 defines a relationship between a maintenance event (paper jam, running out of toner, or the like) and a movie to be played when an occurrence of the maintenance event is detected. In the movie list table 400, maintenance IDs 401 and movie lists 402 are described such that each maintenance ID 401 is related to corresponding one of movie lists 402. The maintenance ID is identification information identifying a maintenance event that occurs in the image forming apparatus 100.

In examples of maintenance IDs illustrated in FIG. 4A, "001" indicates a jam in a paper conveying unit which is detected by the paper discharge unit sensor 315, "002" indicates a jam in a duplex unit which is detected by the duplex unit sensor 316, and "003" indicates a jam in the paper conveying unit and a jam in the duplex unit which are respectively detected by the paper discharge unit sensor 315 and the duplex unit sensor 316.

"004" indicates running out of magenta toner, "005" indicates running out of cyan toner, "006" indicates running out of yellow toner, and "007" indicates running out of black toner. These are detected by the printer device 106.

The movie list 402 is a list of movies to be played when corresponding maintenance events occur. When a maintenance event occurs, a sequence of operation procedures of solving the maintenance event is to be presented. The sequence of operation procedures includes, for example, a procedure of opening a cover, a procedure of removing jammed paper, a procedure of closing the cover, and the like. In the present embodiment, instead of preparing one movie of a sequence of operation procedures individually for each maintenance event, a movie is prepared for each operation procedure (operation element) and a plurality of movies are combined and played to present a sequence of operation procedures to a user. Hereinafter, each movie corresponding to an operation procedure will be referred to as a sub-movie. In the movie list 402, a combination of a plurality of sub-movies and a playing order thereof are stored in relation to a corresponding maintenance ID 401. For example, when the maintenance ID 401 is "001", the combination of sub-movies is a combination of sub-movies A1, A2, and A4 as defined in a corresponding field in the movie list 402. The playing order is defined by an order in which sub-movies are described in the corresponding field in the movie list 402. For example, in a case where the maintenance ID 401 is "001", sub-movies are to be played in order A1, A2, A4.

As illustrated in FIG. 4B, the movie table 410 is a table defining a correspondence among a movie ID 411, a movie file 412, a play time 413, a cover open/close flag 414, a message 415, and an illustration file 416.

The movie ID 411 is an ID identifying a sub-movie. Note that the movie ID 411 is also used in the movie list in the movie list table 400 described above.

The movie file 412 represents a file name of a sub-movie to be played, and a position of the sub-movie file in the storage 111. Although in the present embodiment, the sub-movie files are stored by way of example in the storage 111, the sub-movie files may instead be stored in an external apparatus such as a server connected to the image forming apparatus via a network, a storage device connected to the image formation apparatus via a USB cable, or the like, and the sub-movie files may be read out therefrom as required.

The play time 413 represents a play time needed to play the sub-movie from the beginning to the end thereof.

A value of the cover open/close flag 414 indicates whether a corresponding sub-movie represents a procedure to be performed before or after the cover of the image forming apparatus 100 is opened. In a case where the cover open/close flag 414 has a value of "0", the corresponding sub-movie represents a procedure to be performed before the cover of the image forming apparatus 100 is opened. On the other hand, in a case where the cover open/close flag 414 has a value of "1", the corresponding sub-movie represents a procedure to be performed after the cover of the image forming apparatus 100 is opened.

The message 415 represents a message displayed when a corresponding sub-movie is played.

The illustration file 416 represents a file name of the illustration file to be displayed instead of the sub-movie and location of the illustration file in the storage 111. Although in the present embodiment, the illustration files are stored by way of example in the storage 111, the illustration files may instead be stored in an external apparatus such as a server connected to the image forming apparatus via a network, a storage device connected to the image formation apparatus via a USB cable, or the like, and the illustration files may be read out therefrom as required.

The respective sub-movie files represent operation procedures described below.

A sub-movie A1 represents an operation procedure of opening a right-hand cover 201. A sub-movie A2 represents an operation procedure of removing paper jammed in a region close to the paper discharge unit sensor 315. A sub-movie A3 represents an operation procedure of removing paper jammed in a region close to the duplex unit sensor 316. A sub-movie A4 represents an operation procedure of closing the right-hand cover 201.

A sub-movie B1 represents an operation procedure of opening the toner cover 202. A sub-movie B2 represents an operation procedure of removing an empty magenta toner cartridge. A sub-movie B3 represents an operation procedure of preparing a new magenta toner cartridge. A sub-movie B3 represents an operation procedure of installing the new magenta toner cartridge.

A sub-movie B5 represents an operation procedure of removing an empty cyan toner cartridge. A sub-movie B6 represents an operation procedure of preparing a new cyan toner cartridge. A sub-movie B7 represents an operation procedure of installing the new cyan toner cartridge.

A sub-movie B8 represents an operation procedure of removing an empty yellow toner cartridge. A sub-movie B9 represents an operation procedure of preparing a new yellow toner cartridge. A sub-movie B10 represents an operation procedure of installing the new yellow toner cartridge.

A sub-movie B11 represents an operation procedure of removing an empty black toner cartridge. A sub-movie B12 represents an operation procedure of preparing a new black toner cartridge. A sub-movie B13 represents an operation procedure of installing the new black toner cartridge.

A sub-movie B14 represents an operation procedure of closing the toner cover 202.

Referring again to FIG. 4A, the movie list 402 is described in further detail below. For example, in a case where a paper jam occurs in the conveying unit (in this case, the maintenance ID is "001"), the sub-movie A1 is first played to present the operation procedure of opening the right-hand cover 201. Subsequently, the sub-movie A2 is played to present the operation procedure of removing the jammed paper from the region close to the paper discharge unit sensor 315, and the sub-movie A4 is then played to present the operation procedure of closing the right-hand cover 201. Of the sub-movies displayed, the sub-movie A2 is a sub-movie that represents the operation procedure of resolving the maintenance event, that is, the jam in the paper conveying unit in this example. On the other hand, the sub-movie A1 is a sub-movie representing an operation procedure for make preparations therefor. Hereinafter, the sub-movie representing the operation procedure to be performed before performing the procedure of solving the maintenance event is referred to as a "preparation procedure movie". On the other hand, the operation procedure of solving the maintenance event, that is, the sub-movie representing the operation procedure to be performed after performing the operation procedure represented by the preparation procedure movie is referred to as a "main procedure movie". For example, in a case where the maintenance ID is "001", the sub-movie A1 is used as the preparation procedure movie and the sub-movies A2 and A4 are used as the main procedure movies. In a case where the maintenance ID is "004", the sub-movie B1 is used as the preparation procedure movie and the sub-movies B5, B6, B7, and B14 are used as the main procedure movies. In the present embodiment, sub-movies with a value of 0 for the cover ##open/close flag 414 are preparation procedure movies, and sub-movies with a value of "1" for the cover open/close flag 414 are main procedure movies.

FIGS. 5A to 5D, FIGS. 6A to 6D, FIGS. 7A to 7C, FIGS. 8A and 8B, FIG. 9 are diagrams illustrating examples of screens displayed on the display device 115 according to the present embodiment. Referring to these figures, an outline is described below as to how the displayed screen is changed according to the present embodiment.

In FIGS. 5A to 5D, a screen 500 is displayed such that to-be-displayed data thereof is generated by the CPU 101 by executing a program stored in the storage 111, and the resultant to-be-displayed data is displayed on the display device 115 via the display control unit 114 thereby displaying the screen 500.

Figure 5A:
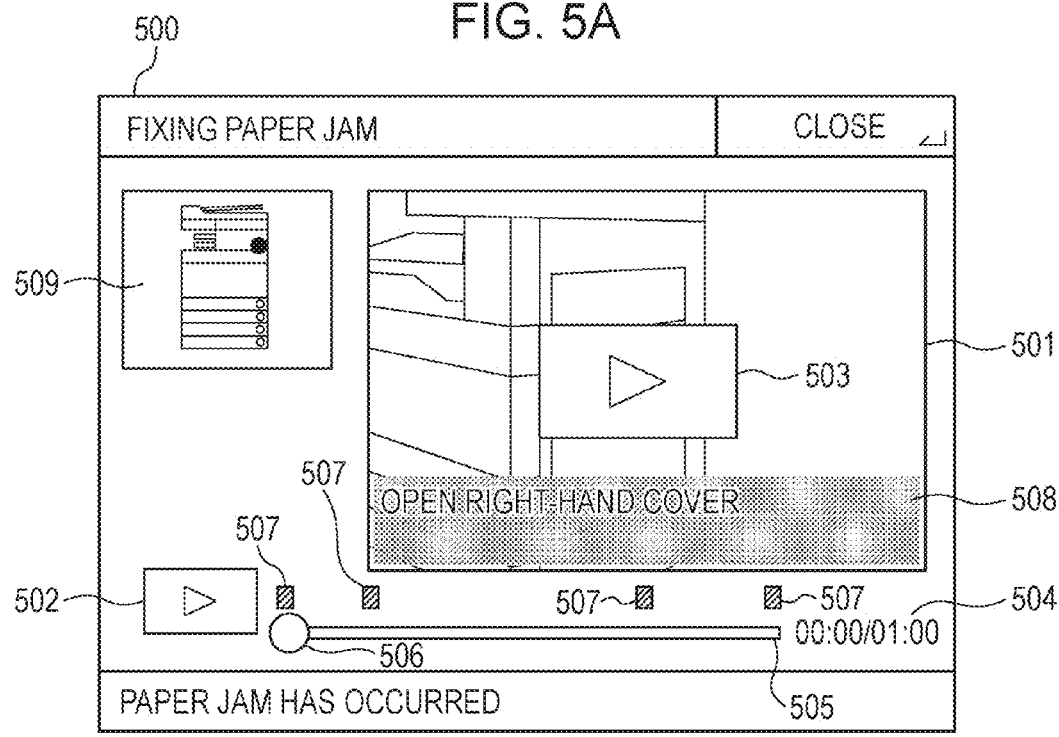
FIGS. 5A to 5D are diagrams illustrating examples of screens of a display device according to an embodiment.

FIG. 5A illustrates an example of a screen that is displayed first when an occurrence of a maintenance event is detected. The following description is given for a case where an occurrence of a jam in the paper conveying unit is detected (in this case, the maintenance ID is 001). In a case where the maintenance ID is 001, then, according to the movie list table 400, sub-movies with movie IDs of A1, A2, and A4 are sequentially played. In the example illustrated in FIG. 5A, the beginning of the sub-movie A1, which is a preparation procedure movie, is displayed in a pause state.

On the screen 500, there are displayed a movie displaying area 501, a play button 502, a play mark 503, a play time indication label 504, a bar 505, a slider 506, a chapter mark 507, a message area 508, and an icon 509.

The movie displaying area 501 is an area for displaying a movie to present a maintenance procedure. In normal, a movie of which frame rate is 12 fps (A number of frames to be updated per second, hereinafter called "a normal frame rate movie") is played in the movie displaying area 501.

The play button 502 is a button used to issue a command to start playing a movie. The play mark 503 is a mark used to issue a command to play a movie, as with the play button 502. When the play button 502 or the play mark 503 is pressed (touched), the CPU 101 starts playing the movie.

The play time indication label 504 indicates the total sum of play times of a plurality of sub-movies to be played (hereinafter referred to as the total playing time) and indicates the current playing position in the total playing time.

A combination of the bar 505 and the slider 506 forms a seek bar that indicates a playing position in the total playing time and that allows a user to change the playing position to a particular position. The bar 505 graphically indicates the total playing time. The slider 506 indicates the current playing position and is used to specify a particular position to which the playing position is to be moved. As the movie proceeds, the slider 506 moves correspondingly within a range of the bar 505. By dragging (moving) the slider 506, it is allowed to move the playing position to a desired position from the current position. When an arbitrary position on the bar 505 is pressed, the playing of the movie is advanced to the pressed position, and the slider 506 is correspondingly moved to the pressed position. The chapter mark 507 indicates a boundary between chapters.

The play time indication label 504 and the chapter mark 507 are described below with reference to specific examples. In a case where the maintenance ID is 001, then, according to the movie list table 400, sub-movies A1, A2, and A4 are sequentially played. The movie table 410 indicates that the play times of these sub-movies are respectively 10 seconds (00:10), 30 seconds (00:30), and 20 seconds (00:20). The total playing time is given by the total sum of play times of sub-movies to be played, and thus in this specific example the total playing time is 1 min 00 sec (01:00). On the other hand, the play time represents the current playing position in the total playing time. For example, in a case where a scene is being displayed that is located 5 seconds (00:05) elapsed from the beginning of the sub-movie A1, which is a sub-movie displayed first, the play time is 5 seconds. On the other hand, in a case where the current scene is at a position where 10 seconds has elapsed from the beginning of the sub-movie A2, which is a second sub-movie in the present combination of sub-movies, the play time is given by the sum of the play time of 10 seconds for the sub-movie A1, whose playing is completed, and the time of 10 seconds which has been spent in playing the sub-movie A1, and thus the play time is 20 seconds (00:20). The play time indication label 504 indicates the play time and the total playing time calculated in the above-described manner in a form in which character strings representing them are separated by a slash (/).

A chapter mark 507 is displayed at a boundary between operation procedures in the sequence of operation procedures. In the present example, two chapter marks 507 are displayed at boundaries at which sub-movies is changed, and more particularly such that one is displayed at a boundary between A1 and A2 and the other is displayed at a boundary between A2 and A4. In addition, two chapter marks 507 may be displayed such that one is at the beginning of the total movie and the other is at the end of the total movie. In the example illustrated in FIG. 5A, chapter marks 507 are displayed at the four positions described above.

In the message area 508, a message is displayed to provide supplementary information in addition to the content of the sub-movie being played. More specifically, for example, when the sub-movie A1 is played, a message "Open right-hand cover" is displayed according to data in a corresponding field of the message 415 of in the movie table 410. The message area 508 may be hidden when a predetermined time has elapsed since the playing of the corresponding sub-movie is started, or the message area 508 may be displayed as long as the corresponding sub-movie is being played.

The icon 509 indicates a part of the image forming apparatus 100 in which a maintenance event occurs. More specifically, for example, in a case where the maintenance ID is 001 indicating that paper jam has occurred in the paper conveying unit, the icon 509 indicates the paper conveying unit.

On the screen illustrated in FIG. 5A, when the play button 502 or the play mark 503 is pressed, playing of a movie is started. In a case where the maintenance ID is 001, the CPU 101 starts playing the sub-movie A1, which is a preparation procedure movie.

Figure 5B:
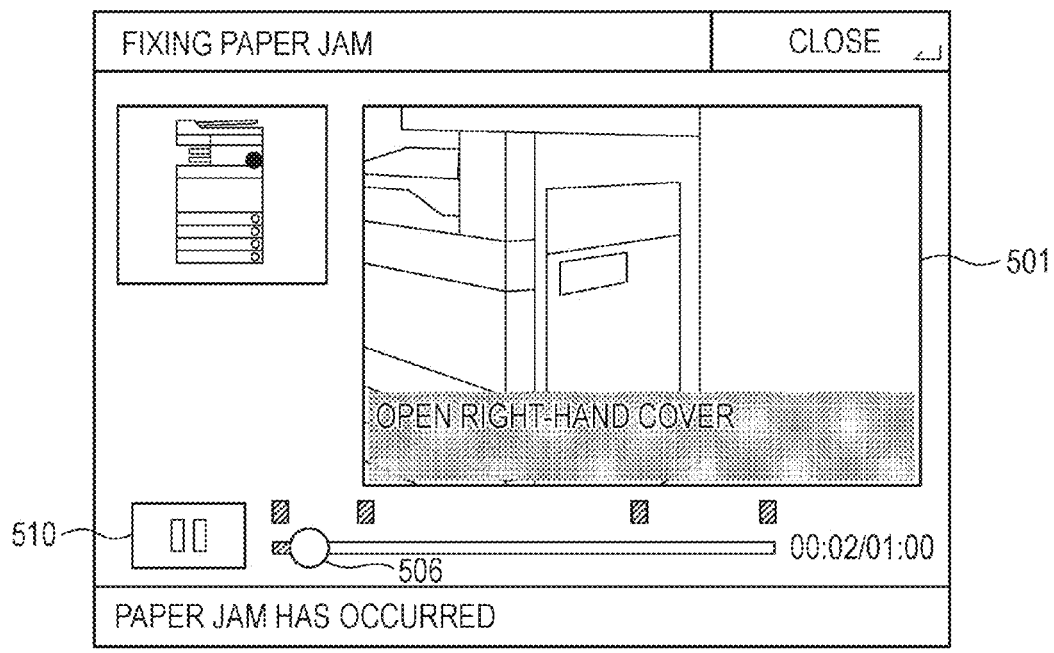

FIG. 5B illustrates an example of a screen at a displaying position of the sub-movie A1 2 seconds after the beginning of the sub-movie A1. In response to starting playing the movie, the play button 502 and the play mark 503 are hidden, and, instead, the pause button 510 is displayed at the same location where the play button 502 was displayed.

Figure 5C:
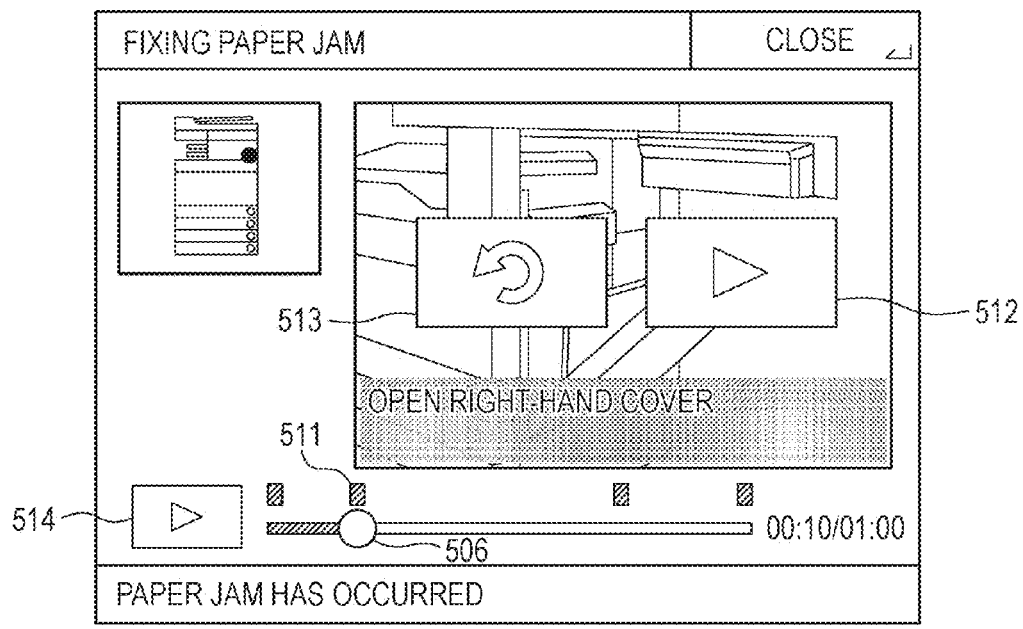

FIG. 5C illustrates an example of a screen in a state in which the playing position has reached the end of the sub-movie A1. At a point of time when the playing of the sub-movie A1 is ended, that is, at the position of the chapter 511, the playing of the movie is automatically stopped and held in a pause state, and the play mark 512 and the replay mark 513 are displayed. The pause button 510 is hidden, and, instead, the play button 514 is displayed at the place where the pause button 510 was previously displayed. The replay mark 513 is a mark used to issue a command to replay the sub-movie being currently in the pause state from the beginning of the sub-movie. More specifically when the movie is in the pause state at the position of the chapter mark 511, if the replay mark 513 is pressed, the CPU 101 moves the playing position of the sub-movie A1 to the beginning thereof and restarts playing the sub-movie A1. By controlling the playing of the movie such that when the playing position reaches the end of a sub-movie, the playing is automatically stopped and held in the pause state as described above, it is possible to prevent the movie from proceeding to a next operation procedure without taking into account the user's intention. Furthermore, when the operation comes into the pause state, the replay mark 513 is displayed together with the play mark 512, it becomes easy for a user to select whether to proceed to a movie of a next operation procedure or replay the same movie.

FIG. 15D illustrates an example of a screen displayed when opening of the right-hand cover 201 is detected in the middle of the process of playing the sub-movie A1. When opening of the right-hand cover 201 is detected, the CPU 101 automatically ends the playing of the sub-movie A1 and displays the sub-movie A2, which is a first sub-movie of the main procedure movies, in such a manner that the playing is stopped at the beginning (chapter mark 515) of the sub-movie A2. In this case, of various marks, only the play mark 516 is displayed. By displaying only the play mark 516, it becomes possible to prompt a user to watch the movie to know what to do next in the operation procedure. In the message area 508, a message "Remove the paper from the paper conveying unit" corresponding to the sub-movie A2 is displayed. In a case where the right-hand cover 201 is already opened, it is not necessary to play the sub-movie A1, and thus the replay mark is not displayed. In a case where the operation instructed by the preparation procedure movie is completed, the playing of the movie automatically proceeds to a main procedure movie, which ensures that an instruction of a next procedure is presented to a user.

Figure 5D:
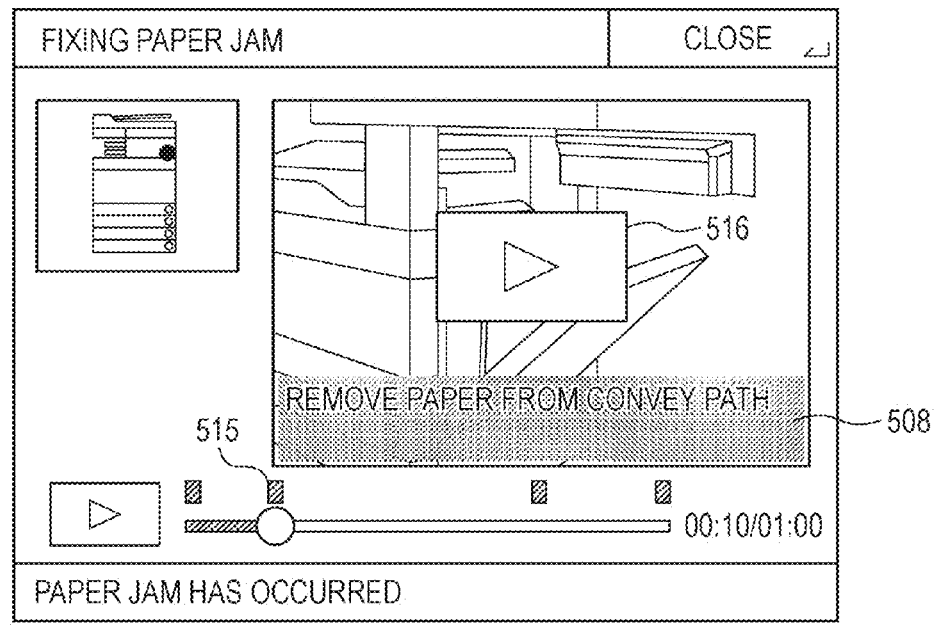

As may be seen from a comparison between FIG. 5C and FIG. 5D, the movie is in the pause state at the same chapter position (511, 515) but there is a difference in whether the replay mark is displayed or not. As described above, even in a case where the movie is in the pause state at the boundary between the preparation procedure movie and the main procedure movie, a user is allowed to easily get to know whether the operation instructed by the preparation procedure movie is completed, by checking whether the replay mark is displayed or not.

Figure 6A:
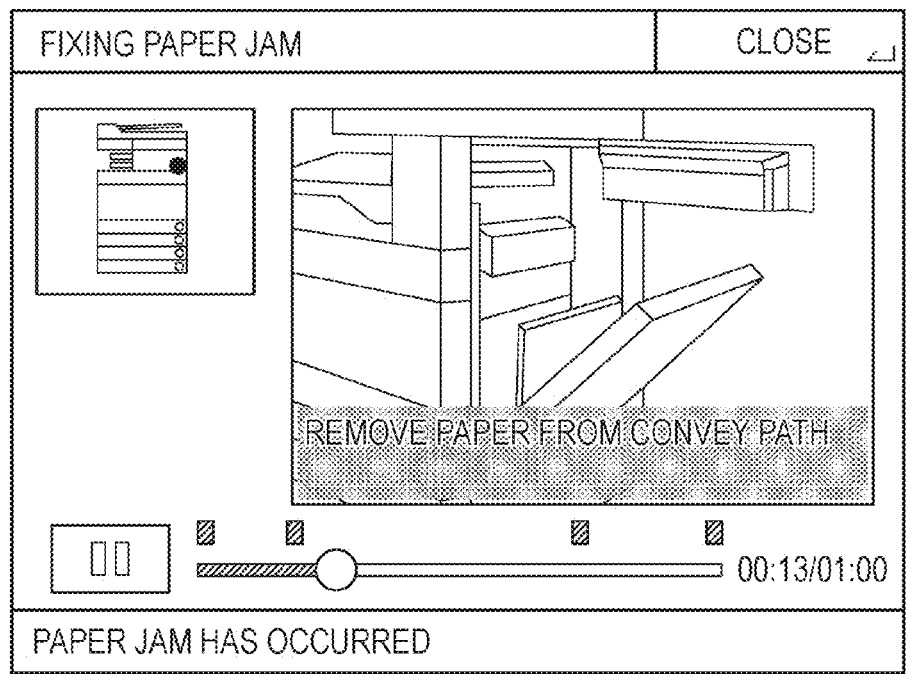
FIGS. 6A to 6D are diagrams illustrating examples of screens of a display device according to an embodiment.

In the screen illustrated in FIG. 5C or in that illustrated in FIG. 5D, when the play mark 512 or 516 or the play button 514 is pressed, playing of the sub-movie A2 is started. FIG. 6A illustrates an example of a screen of the sub-movie A1 displayed when 3 seconds have elapsed since the playing of the sub-movie A2 is started.

Figure 6B:
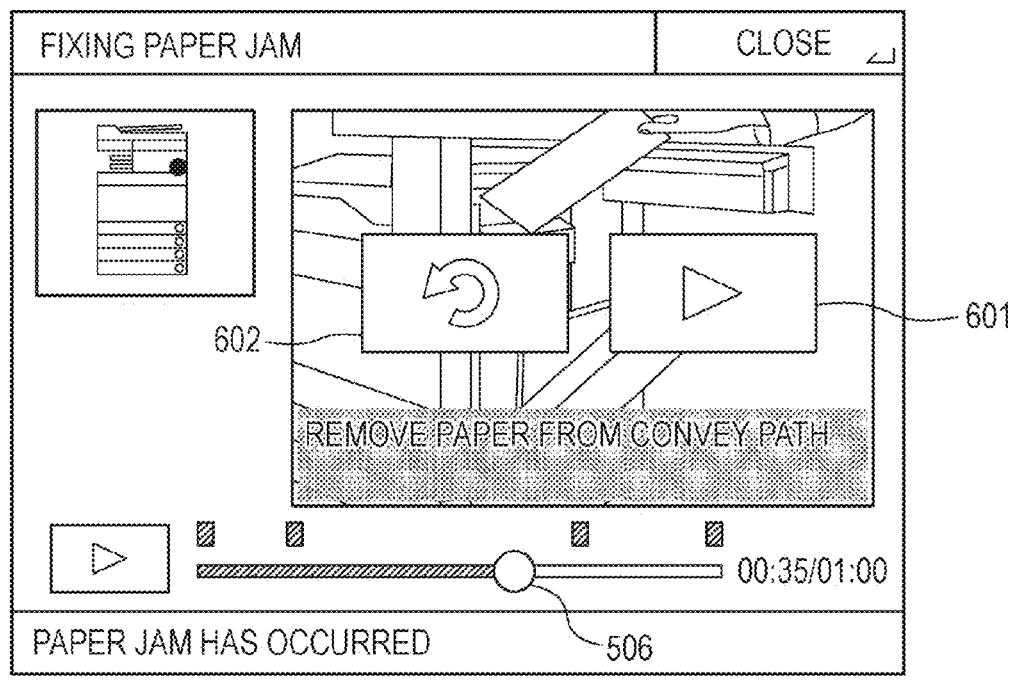

FIG. 6B illustrates an example of a screen displayed when the pause button or the movie displaying area is pressed in the middle of the operation of playing the sub-movie A2. When the pause button or the movie displaying area is pressed, the playing of the movie is stopped, and the replay mark 602 is displayed together with the play mark 601.

Figure 6C:
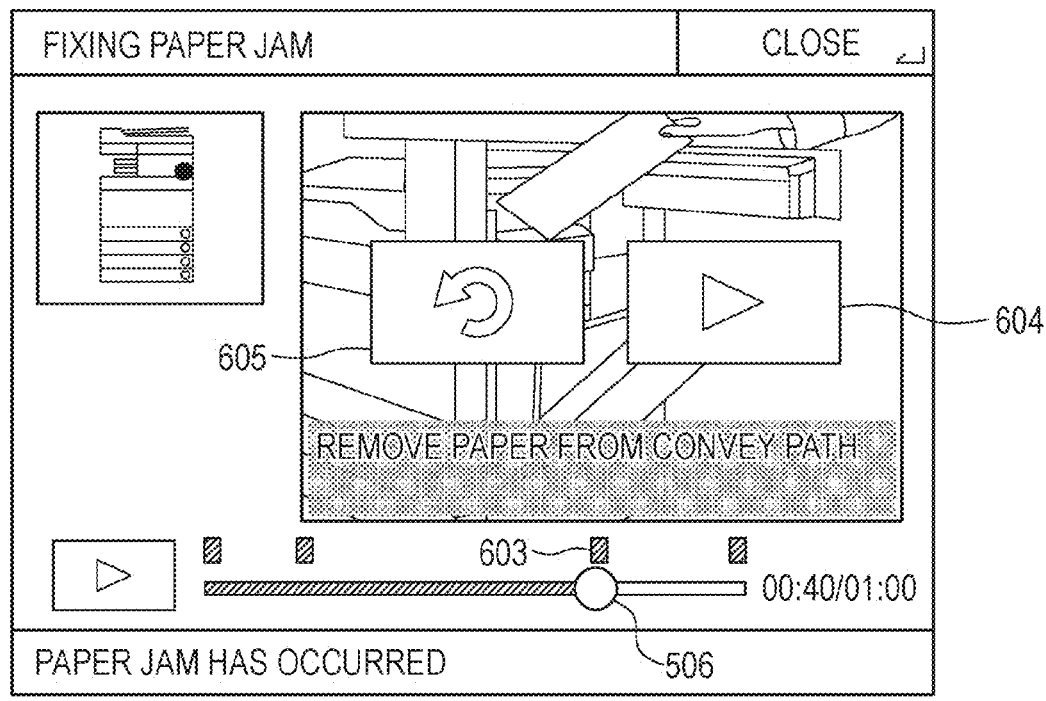

FIG. 6C illustrates an example of a screen displayed in a state in which the playing operation has reached the end of the sub-movie A2. At a point of time when the playing of the sub-movie A2 is ended, that is, at a position of a chapter 603, the playing of the movie is automatically stopped and held in a pause state, and a replay mark 605 is displayed together with a play mark 604.

Figure 6D:
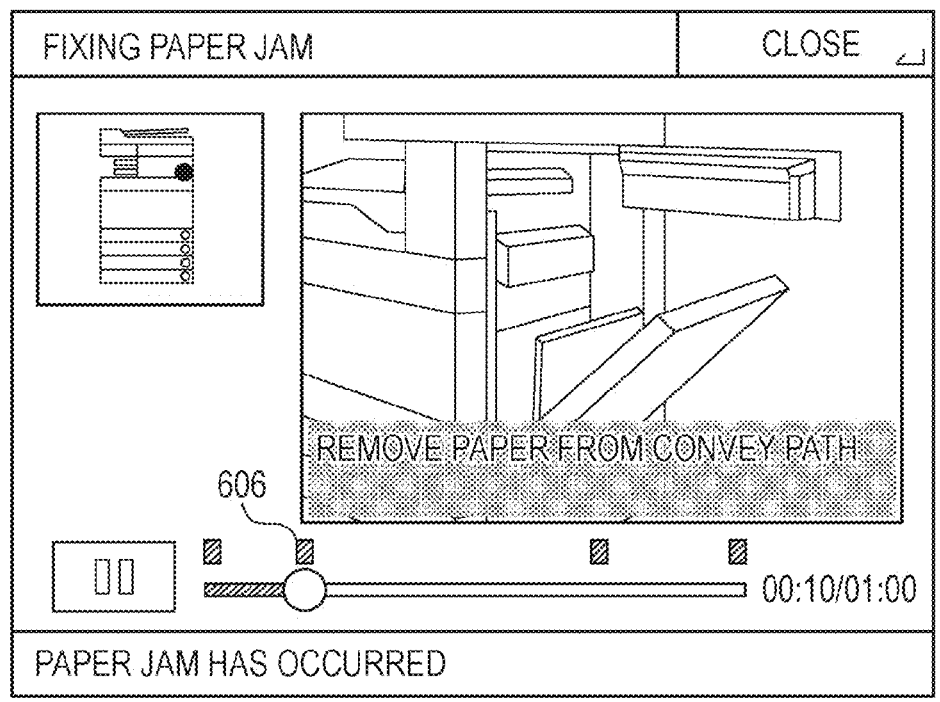

FIG. 6D illustrates an example of a screen displayed when the replay mark 602 in the screen displayed in FIG. 6B or the replay mark 605 in the screen displayed in FIG. 6C is pressed. When the replay mark 602 or 605 is pressed, the position is moved to the beginning (chapter 606) of the sub-movie A2 being currently in the pause state and the playing is restarted from the beginning of the sub-movie A2.

As described above, also in a case where the playing of the movie is stopped temporarily in response to an intentional operation performed by a user, the replay mark is displayed together with the play mark as with the case in which playing of a movie is automatically stopped temporarily when playing of a sub-movie is completed.

Figure 7A:
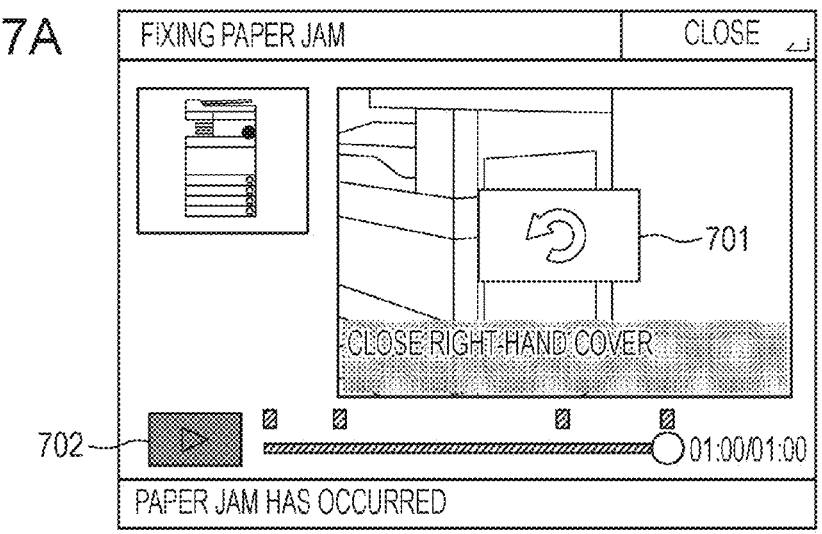
FIGS. 7A to 7C are diagrams illustrating examples of screens of a display device according to an embodiment.

FIG. 7A illustrates an example of a screen displayed in a state in which the playing position has reached the end of the total movie (the end of the sub-movie A4 in a case where the maintenance ID is 001). In this case, there is no sub-movie to be displayed next, and thus only the replay mark 701 is displayed and the play mark is not displayed. The play button 702 is grayed out to indicate that the play button 702 is disabled.

Figure 7B:
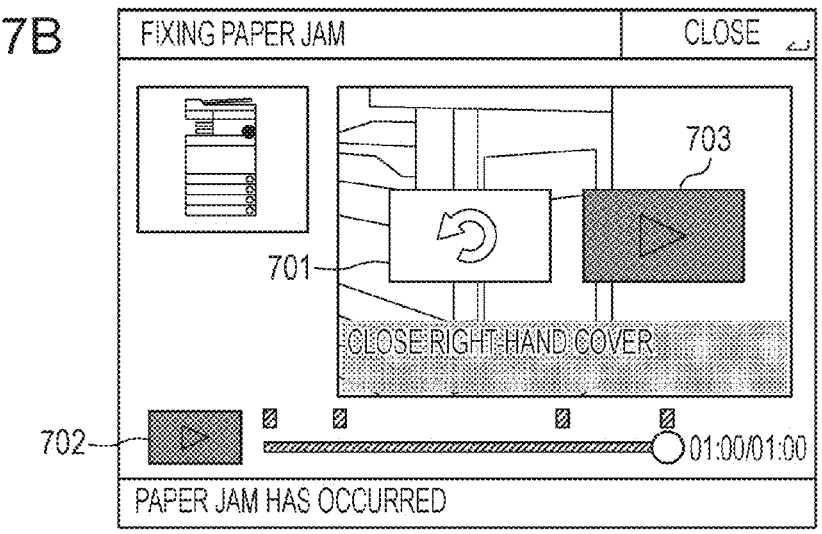

FIG. 7B illustrates another example of a screen displayed in a state in which the playing position has reached an end of a movie. Unlike the example illustrated in FIG. 7A, a play mark 703 is displayed together with the replay mark 701, but the play mark 703 is grayed out to indicate that the play mark 703 is disabled. Even if the grayed-out play button 702 or play mark 703 is pressed, the pressing is ignored.

As described above, when the playing is completed for the whole of the plurality of sub-movies corresponding to the maintenance event that has occurred, the screen displayed in this state is different from that displayed when the playing is stopped temporarily in the middle of the playing operation, and this difference makes it possible for a user to recognize that the playing of the whole movie is completed.

Figure 7C:
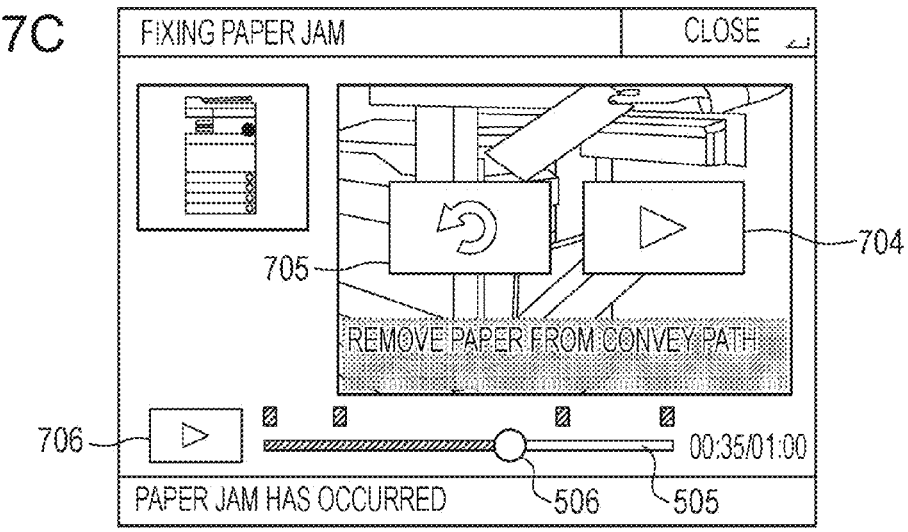

FIG. 7C illustrates an example of a screen displayed when the slider 506 is moved in the state illustrated in FIG. 7A or 7B. In this case, a play mark 704 is displayed together with a replay mark 705. Furthermore, the gray-out mode for the play button 706 is released. As described above, even in the state in which playing of a movie is completed until the end of the movie, it is allowed to replay the movie from an arbitrary position specified by moving the slider 506 or pressing the bar 505.

Figure 8A:
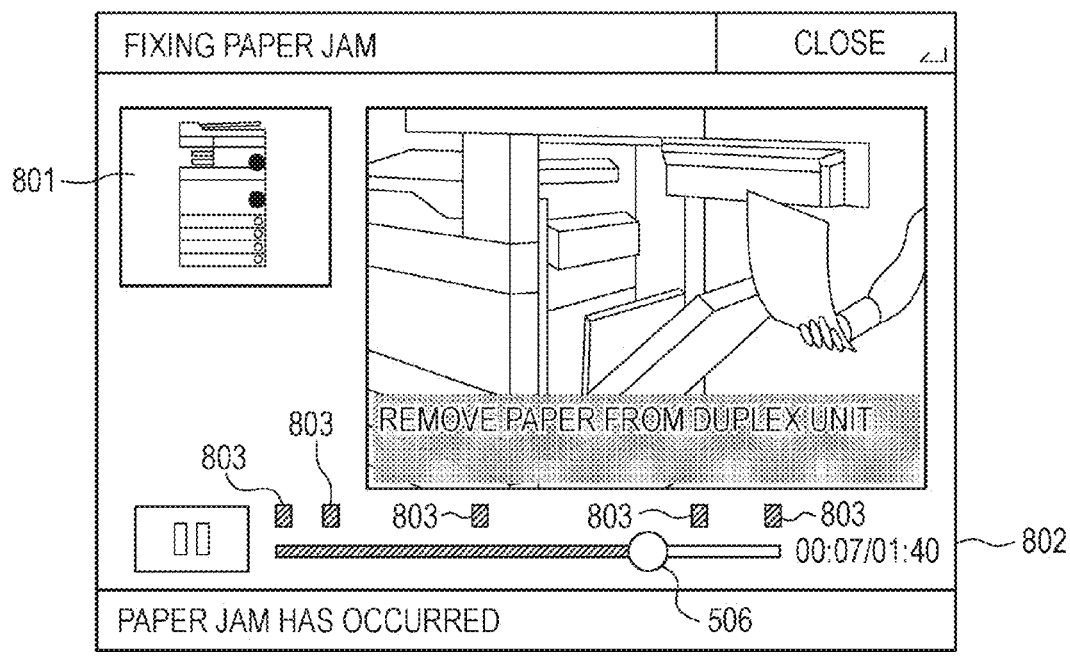
FIGS. 8A and 8B are diagrams illustrating examples of screens of a display device according to an embodiment.

FIG. 8A illustrates an example of a screen displayed in a situation in which jams in the paper conveying unit and in the duplex unit are detected (in this case, the maintenance ID is 003) and a corresponding movie is being played.

An icon 801 indicates that paper jams have occurred in the paper conveying unit and also in the duplex unit. In a case where the maintenance ID is 303, then, according to the movie list table 400, sub-movies with movie IDs of A1, A2, A3, and A4 are sequentially played. Thus, the play time indication label 802 indicates that the total playing time given by the total sum of play times of these sub-movies is 1 minute 40 seconds (01:40) and also indicates the current playing position. Chapter marks 803 are displayed at following respective positions: the beginning of the movie; the end of the movie; and boundaries between adjacent sub-movies. In the example illustrated in FIG. 8A, the playing is completed for the sub-movie A2 representing the procedure of removing the paper jammed in a region close to the paper discharge unit sensor 315, and playing of the sub-movie A3 is in progress to present the procedure of removing jammed paper from a region close to the duplex unit sensor 316. Herein it is assumed by way of example that a user has completed the process of removing the jammed paper from the region close to the paper discharge unit sensor 315 according to the procedure presented by the sub-movie A2.

Figure 8B:
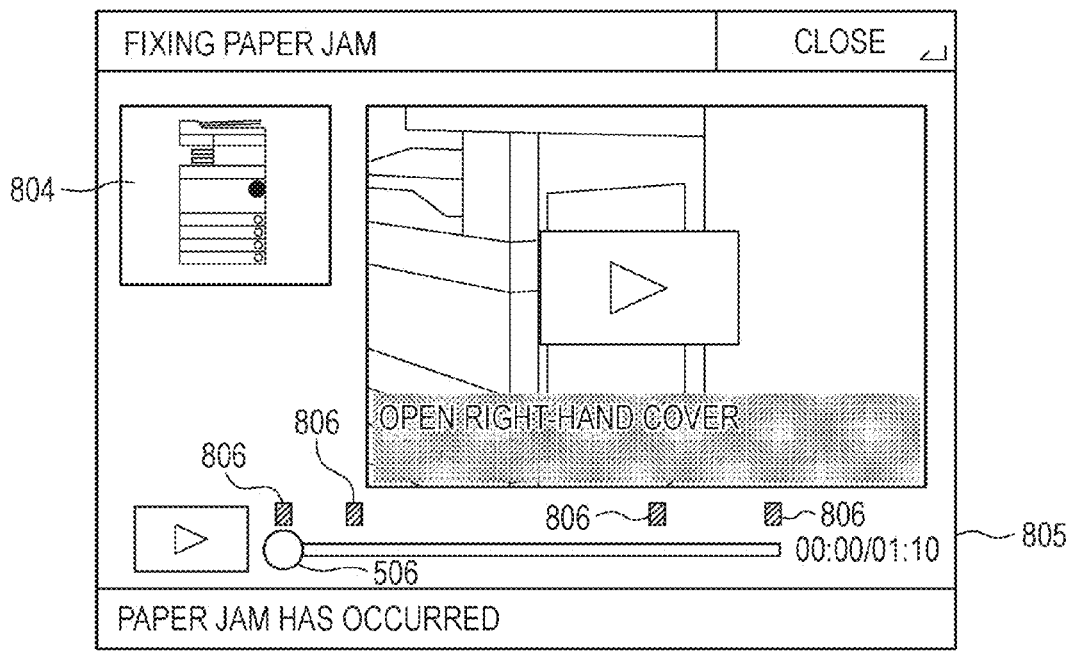

FIG. 8B illustrates an example of a screen displayed when closing of the right-hand cover 201 is detected in the state in which the screen illustrated in FIG. 8A is displayed. In this situation, the paper jam in the duplex unit is not yet solved although the paper jam in the paper conveying unit has been solved, and thus the CPU 101 updates the maintenance ID and switches the operation to play the movie corresponding to the jam in duplex unit (in this case, the maintenance ID is "002"). More specifically, in a case where the maintenance ID is "002", then, according to the movie list table 400, sub-movies with movie IDs of A1, A3, and A4 are sequentially played. In other words, the CPU 101 displays a screen in which the beginning of the sub-movie A1 is displayed in a pause state. Furthermore, the displaying is updated for the icon 804, the play time indication label 805, and the chapter mark marks 806.

As described above, at a time when closing of the cover is detected, checking is performed again as to the maintenance event occurring in the image forming apparatus 100, and the movie to be further displayed is changed as necessary depending on the result of the checking. Thus, in a case where a plurality of failures such as a jam in the paper conveying unit, a jam in duplex unit, or the like occur, when a user closes a cover in the operation of solving the failures, information is given to the user such that the user is allowed to recognize which part of the operation has been completed.

Figure 9:
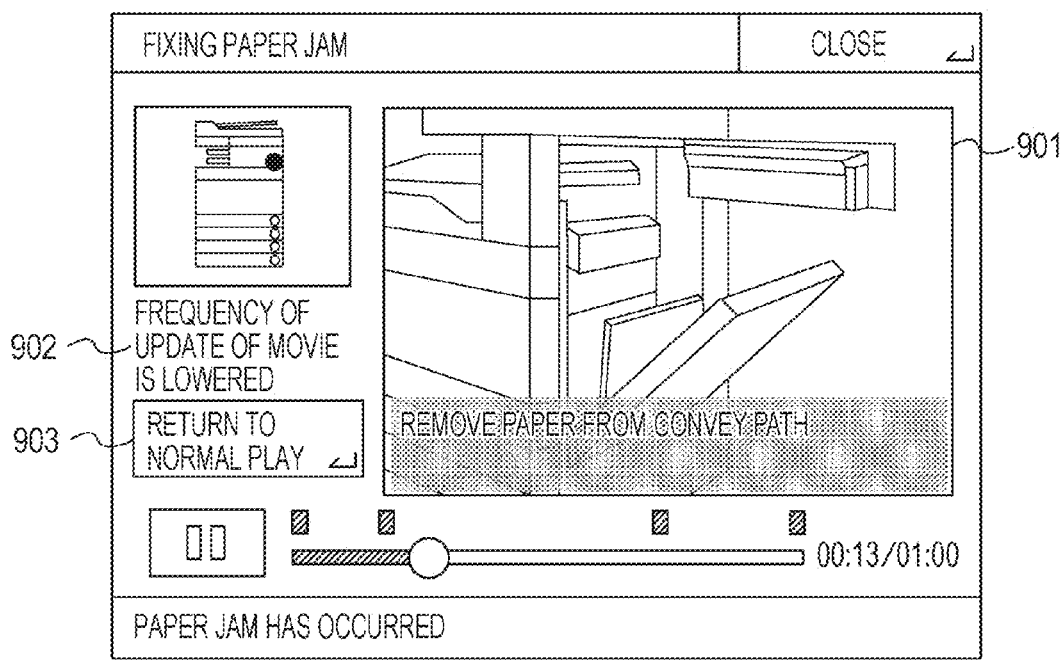
FIG. 9 is a diagram illustrating examples of screen of a display device according to an embodiment.

FIG. 9 illustrates an example of a screen displayed when a movie of which frame rate is lower than normal (hereinafter called "low frame rate movie") is played. These screen is displayed when a job such as a reading a document by the scanner device 108 is started in the state in which the movie for presenting maintenance procedure is being displayed In the present embodiment, the image processing apparatus switches to play the low frame rate movie when an instruction for playing a movie by a user is issued after the playing of the movie is stopped and held in a pause state, without switching to play the low frame rate movie as soon as a job is stated.

A movie of which frame rate is 3 fps (normal frame rate is 12 fps) is played in the movie displaying area 901.

A low frame rate play notification message 902 represents a message indicating the low frame rate movie is being played.

A normal play switch button 903 is a button used to issue a command to switch from playing the low frame rate movie to playing the normal frame rate movie.

As described above, when the low frame rate movie is being played, the screen illustrated in FIG. 9 is displayed instead of the screen illustrated in FIG. 5(b), 6(a), 8(a) described above.

FIGS. 10 to 15 are flow charts illustrating processes performed by the CPU 101 illustrated in FIG. 1 to display maintenance procedures.

Figure 10:
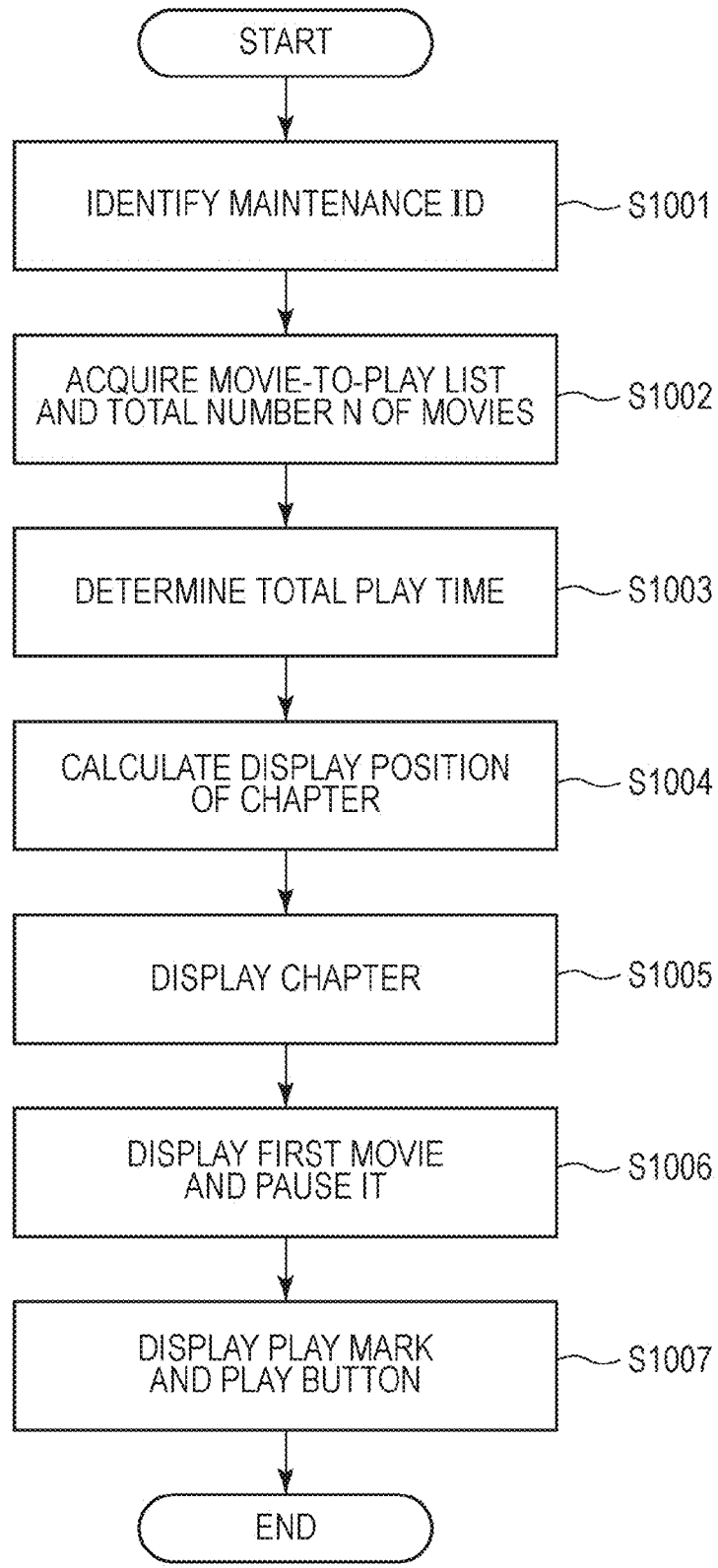
FIG. 10 is a flow chart illustrating a processing procedure according to the first embodiment.

The process illustrated in FIG. 10 is started when the printer control unit 105 detects a change in any one of values output by the following sensors: a sensor that detects an open/closed state of the right-hand cover 201 and that of the toner cover 202, the paper discharge unit sensor 315, and the duplex unit sensor 316.

First, the CPU 101 determines which maintenance event has occurred and identifies the maintenance ID (S1001). For example, in a case where the value output by the paper discharge unit sensor 315 indicates that printing paper is jammed in a region close to this sensor, the CPU 101 determines that the maintenance ID is 001 (jam in the paper output unit).

Subsequently, the CPU 101 refers to the movie list table 400 to acquire a list of sub-movies corresponding to the maintenance ID determined in S1001 and also acquire the total number N of sub-movies (S1002). For example, in a case where the identified maintenance ID is 001, sub-movies to be played are A1, A2, and A4, and the total number of sub-movies is 3. The CPU 101 temporarily stores the identified sub-movies in the RAM 104, for example, in the form of array information, in the order in which the sub-movies are to be played.

In S1003, the CPU 101 calculates the total playing time of the movie. More specifically, according to the movie table 410, the CPU 101 acquires the play times 413 of the respective sub-movies acquired in S1002, and calculates the total sum of these play times 413. The CPU 101 displays the play time indication label (504 in FIG. 5A) and the like according to the calculated total playing time.

Subsequently, the CPU 101 calculates the positions at which to display the respective chapter marks based on the play times 413 of the respective sub-movies (S1004). The CPU 101 then displays the chapter marks at the positions, calculated in S1004, on the bar (S1005).

In S1006, the CPU 101 loads the sub-movie with the first movie ID into the RAM 104 and outputs it to the display device 115 such that the sub-movie is displayed in the pause state. For example, in a case where the maintenance ID is "001", the CPU 101 loads the sub-movie A1, which is a preparation procedure movie, into the RAM 104 and outputs it to the display device 115 such that the sub-movie is displayed in the pause state.

The CPU 101 then outputs the play mark and the play button to the display device 115 (S1007). Thus, the screen illustrated in FIG. 5A is displayed.

Although in S1003 and S1004 described above, the CPU 101 calculates the total playing time and the positions at which to display the respective chapter marks by using the play times 413 described in the movie table 410, the CPU 101 may not use the play times 413. In other words, the CPU 101 may load the plurality of sub-movies into the RAM 104 and calculate the play times of the respective sub-movies from the frame rate and the numbers of frames of the respective sub-movies. Furthermore, from these calculated values, the CPU 101 may further calculate the total playing time and the positions at which to display the respective chapter marks.

Note that in the present embodiment, there is no particular restriction on the format or the codec of movies, and various formats or codecs may be employed.

Figure 11:
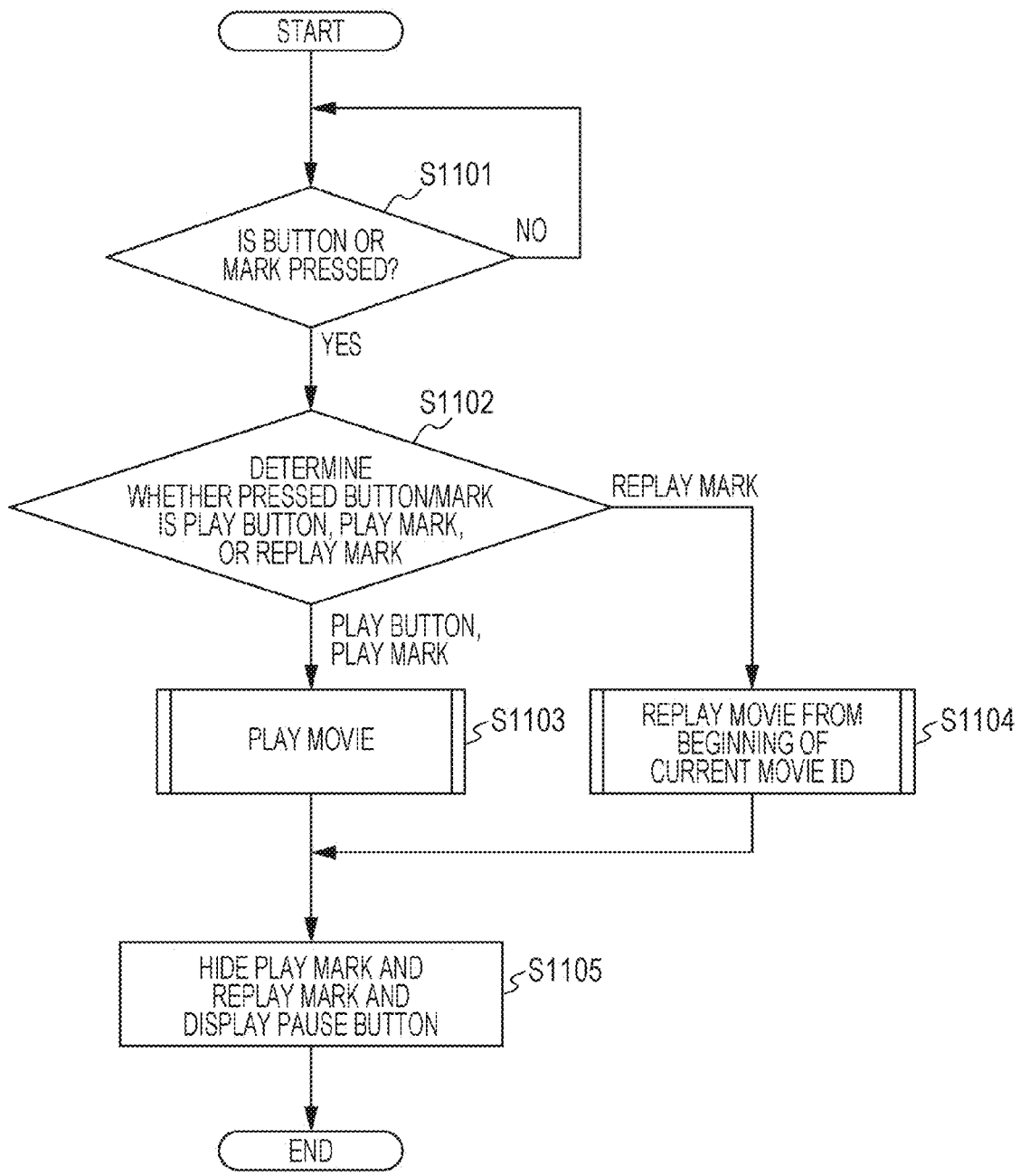
FIG. 11 is a flow chart illustrating a processing procedure according to the first embodiment.

FIG. 11 is a flow chart illustrating a processing procedure performed when the play button, the play mark, or the replay mark is pressed when the movie for presenting the maintenance procedure is in the pause state.

The CPU 101 determines whether a button or a mark is pressed (S1101). Subsequently, the CPU 101 determines whether the button/mark is pressed or the replay mark is pressed (S1102). In a case where it is determined that the play button or the play mark is pressed, the processing flow proceeds to S1103 in which the CPU 101 changes the operation state of the movie into a playing state. On the other hand, in a case where it is determined that the replay mark is pressed, the processing flow proceeds to S1104, in which the CPU 101 moves the playing position of the sub-movie being currently in the pause state to the beginning of the sub-movie and starts replaying the sub-movie from the beginning. The process of S1103 and S1104 will be described in detail hereinafter with reference to FIG. 16.

In S1105, the CPU 101 hides the replay mark and the play mark and displays the pause button on the display device 115. Thus, the screens illustrated in FIG. 5B, FIG. 6A, FIG. 6D, or the like are displayed.

Figure 12:
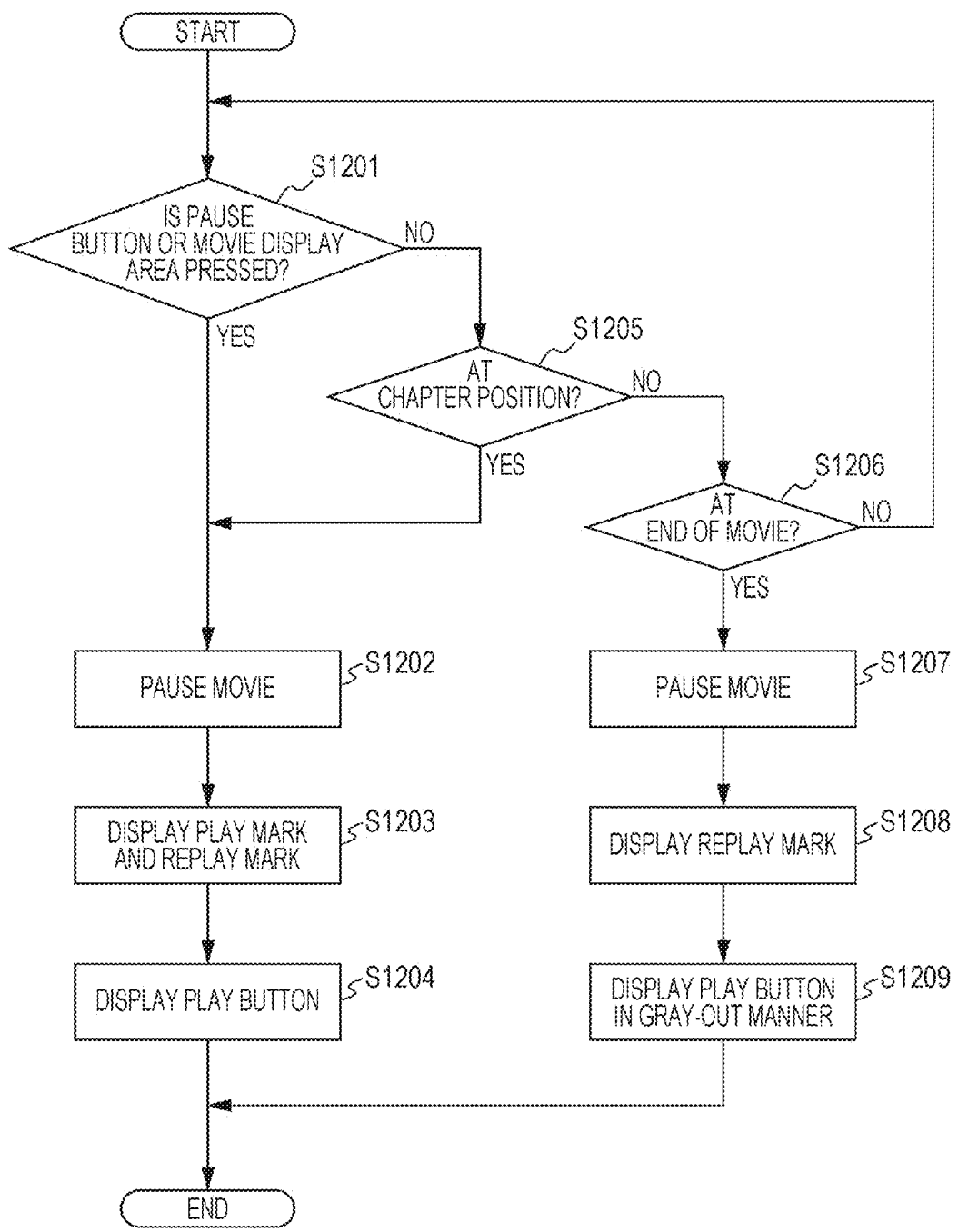
FIG. 12 is a flow chart illustrating a processing procedure according to the first embodiment.

FIG. 12 is a flow chart illustrating a processing procedure performed to stop playing of a movie representing a maintenance procedure.

The CPU 101 determines whether the pause button or the movie displaying area is pressed (S1201). In a case where it is determined that the pause button or the movie displaying area is pressed, the processing flow proceeds to S1202 in which the CPU 101 changes the operation state of the movie into the pause state.

subsequently, the CPU 101 displays the play mark and the replay mark on the display device 115 (S1203).

Furthermore, the CPU 101 displays the play button on the display device 115 (S1204), and ends the process. Thus, the screen illustrated in FIG. 6B is displayed.

In a case where it is determined in S1201 that the pause button and the movie displaying area are not pressed, the processing flow proceeds to S1205, in which the CPU 101 determines whether the playing position of the movie is at a position corresponding to one of chapter marks. Note that the chapter marks are at boundaries between sub-movies, and the beginning and the end of the total movie are not included in the chapter mark positions. In a case where it is determined that the playing position of the movie is at one of chapter mark positions, the CPU 101 performs the process from S1202 to S1204 described above. Thus, the screens illustrated in FIG. 5C and FIG. 6C are displayed.

On the other hand, in a case where it is determined in S1205 that the playing position of the movie is not at any one of the chapter mark positions, the CPU 101 determines whether the playing position of the movie has reached the end of a sub-movie (S1206). In a caser where it is determined that the end of a sub-movie has been reached, the CPU 101 changes the operation state of the movie into a pause state (S1207). On the other hand, in a case where it is determined that the end of a sub-movie has not been reached, the CPU 101 returns the process to S1201. After S1207, the CPU 101 displays the replay mark on the display device 115 (S1208).

Furthermore, the CPU 101 displays the play button in the grayed-out manner on the display device 115 (S1209). Thus, the screen illustrated in FIG. 7A is displayed. Alternatively, in S1208, the grayed-out play mark may be displayed together with the replay mark (FIG. 7B).

Figure 13:
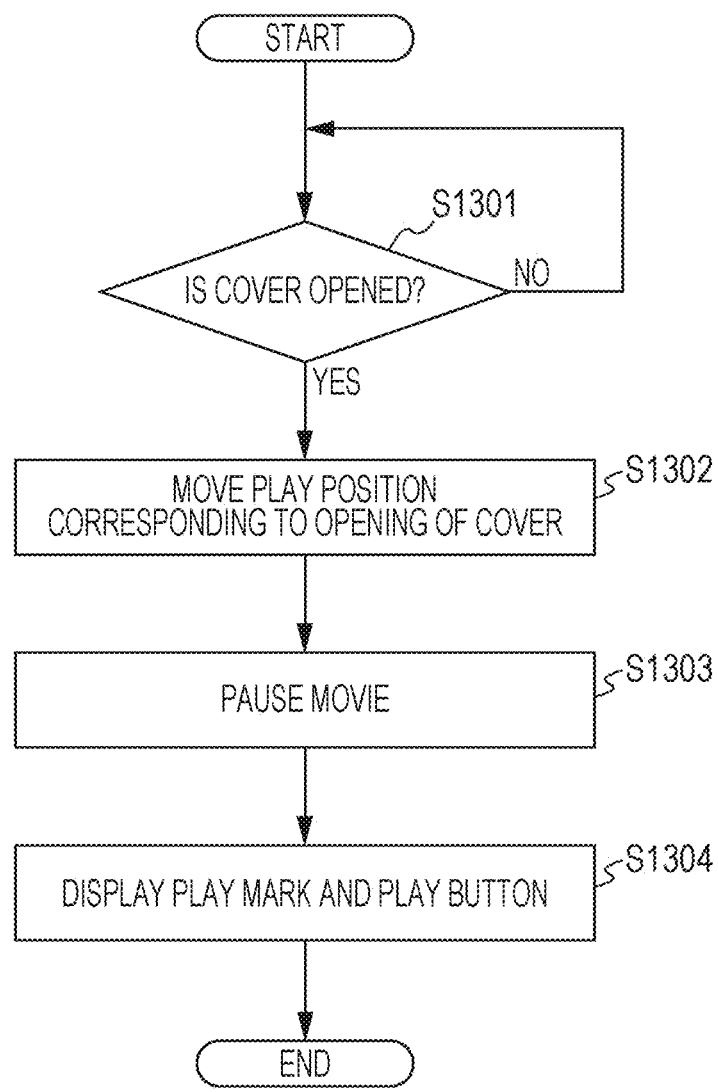
FIG. 13 is a flow chart illustrating a processing procedure according to the first embodiment.

FIG. 13 is flow chart illustrating a process performed when the cover of the image forming apparatus 100 is opened in a state in which a movie representing a maintenance procedure is being displayed.

In S1301, the CPU 101 determines whether a cover is opened that corresponds to a currently occurring maintenance event. For example, in a case where the jam in the paper conveying unit (in this case, the maintenance ID is 001) occurs, the movie includes the sub-movie A1 representing the operation procedure of opening the right-hand cover 201, and thus the CPU 101 checks the value output from the sensor of the right-hand cover 201 to determine whether the right-hand cover 201 is opened. In a caser where it is determined that the corresponding over is opened, the CPU 101 checks the value of the cover open/close flag 414 in the movie table 410 and moves the playing position of the movie to the beginning of a first sub-movie specified by the cover open/close flag 414 and representing an operation procedure to be performed after the cover is opened, that is, to the beginning of the main procedure movie (S1302). For example, in a case where the maintenance ID is 001, the first sub-movie in the main procedure movie, that is, the first sub-movie corresponding to the value of 1 of the cover open/close flag 414 is A2. Therefore, the CPU 101 moves the playing position of the movie to the beginning of the sub-movie A2.

The CPU 101 then changes the operation state of the movie into the pause state (S1303), and displays the play mark and the play button on the display device 115 (S1304). Thus the screen illustrated in FIG. 5D is displayed. Note that in the present process, also in a case where opening of the corresponding cover is detected when the main procedure movie is being played, the process from S1302 to 1304 is performed. For example, in a case where the maintenance ID is "001", if opening of the right-hand cover 201 is detected again in the middle of the operation of playing the sub-movie A2 in the main procedure movie, the CPU 101 changes the displayed screen to that illustrated in FIG. 5D. Thus, also in a case where the playing position is moved to the main procedure movie by operating the seek bar before the cover is opened, it is possible to instruct what procedure is to be performed next, which prevents a user from missing watching the instruction of the operation procedure.

Figure 14:
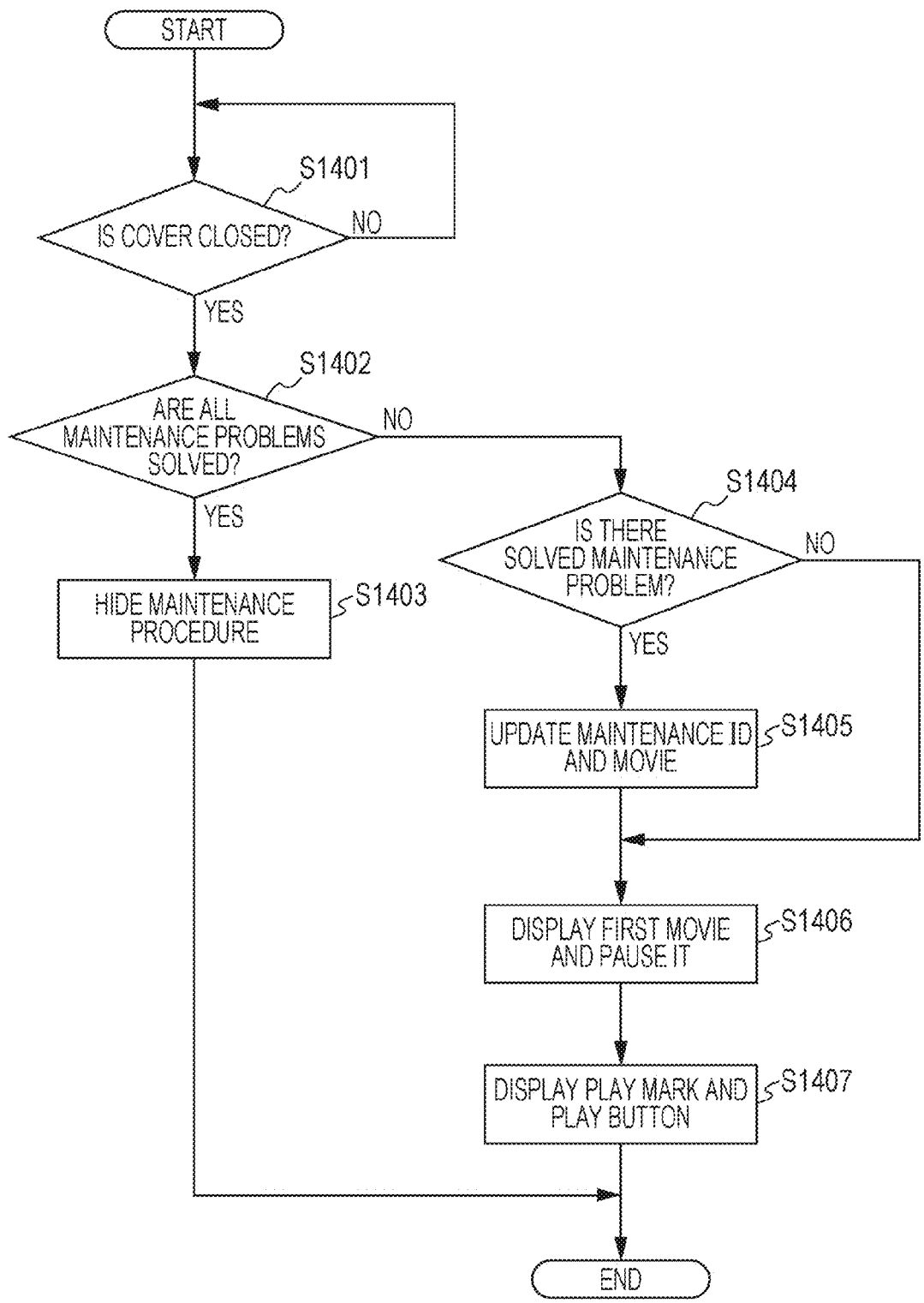
FIG. 14 is a flow chart illustrating a processing procedure according to the first embodiment.

FIG. 14 is a flow chart illustrating a process performed when the cover of the image forming apparatus 100 is closed in a state in which a movie representing a maintenance procedure is being played.

In S1401, the CPU 101 determines whether the cover in the open state is closed. In a case where it is determined that the cover is closed, the CPU 101 determines whether all maintenance events have been solved (S1402). For example, in a case where a jam in the paper conveying unit and a jam in duplex unit occur, if the right-hand cover 201 is closed in the middle of the operation of playing a corresponding movie, the CPU 101 checks the values of the paper discharge unit sensor 315 and the duplex unit sensor 316 to determine whether the jam in the paper conveying unit and the jam in duplex unit have been solved. In a case where it is determined that both jams have been solved, the CPU 101 advances the process to S1403. In a case where it is determined that both jams have not been solved, the CPU 101 advances the process to S1404.

In S1403, the CPU 101 hides the screen for presenting the maintenance procedure and ends the process.

In S1404, the CPU 101 determines whether there is a maintenance event that has been solved. For example, the determination is performed as to whether either the jam in the paper conveying unit or the jam in duplex unit has been solved. In a case where it is determined that there is a maintenance event that has been solved, the CPU 101 changes the maintenance ID determined in S1001 in FIG. 10 to a maintenance D corresponding to a maintenance event that has not yet been solved (S1405). For example, when jams occur in both the paper conveying unit and the duplex unit (in this case, the maintenance ID is 003), if the jam in the paper conveying unit is solved when the corresponding maintenance procedure is being presented, and subsequently if the right-hand cover 201 is closed, then the CPU 101 changes the maintenance D to 002. Furthermore, the CPU 101 loads a movie corresponding to the changed maintenance ID into the RAM 104. The CPU 101 then calculates the total playing time and places chapter marks. The detailed process is similar to that performed in S1001 to S1005 described above, and thus a further description of omitted.

Subsequently, the CPU 101 loads the movie corresponding to the changed maintenance ID into the RAM 104 and displays the movie on the display device 115 in the pause mode (S1406). For example, in a case where the maintenance ID is 002, according to the movie list table 400, the CPU 101 displays a screen in which the sub-movie A1 is displayed such that the sub-movie 1 is stopped at the beginning thereof.

The CPU 101 then displays the play mark and the play button on the display device 115 (S1407). Thus, the screen is switched from that illustrated in FIG. 8A to that illustrated in FIG. 8B. In this processing, the movie of the operation procedure that has already been completed is not played again, but the movie associated with the maintenance event that has not yet been solved is played from its beginning, which allows an improvement in maintenance efficiency and which prevents a user from missing watching the instruction of the operation procedure.

Figure 15:
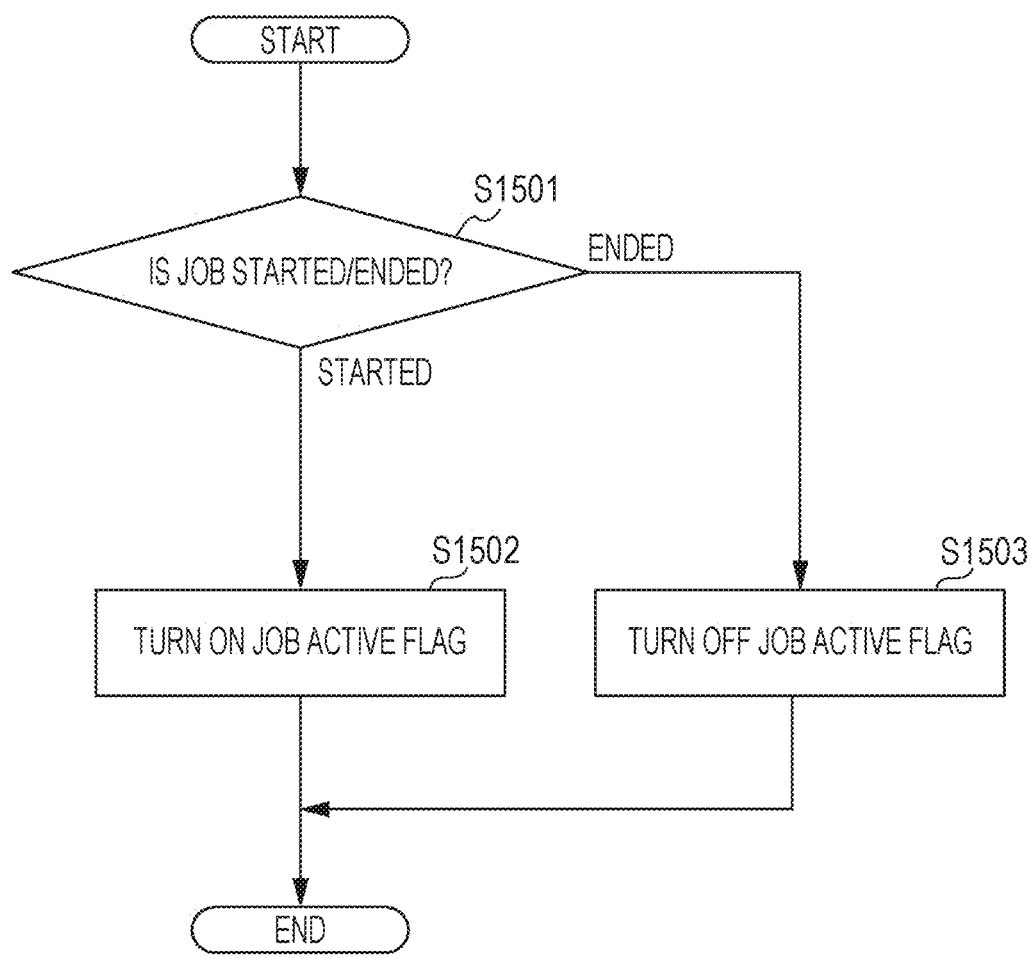
FIG. 15 is a flow chart illustrating a processing procedure according to the first embodiment.

FIG. 15 is a flow chart illustrating a processing procedure performed when a change of a job execution status (start or end of scan job by the scanner device 108, start or end of print job by the printer device 106, etc.) is detected by the CPU 101.

The CPU 101 determined whether a job is started or ended when the change of the job execution is detected (S1501). For example, it is determined that the job is started in a case where a printing process by the printer device 106 is started, and it is determined that the job is ended in a case where the printing process is completed.

The CPU 101 turns on a job active state flag and loads it into the RAM 104 when it is determined the job is started (S1502). The CPU 101 turns off the job active state flag and loads it into the RAM 104 when it is determined the job is ended (S1503)

Figure 16:
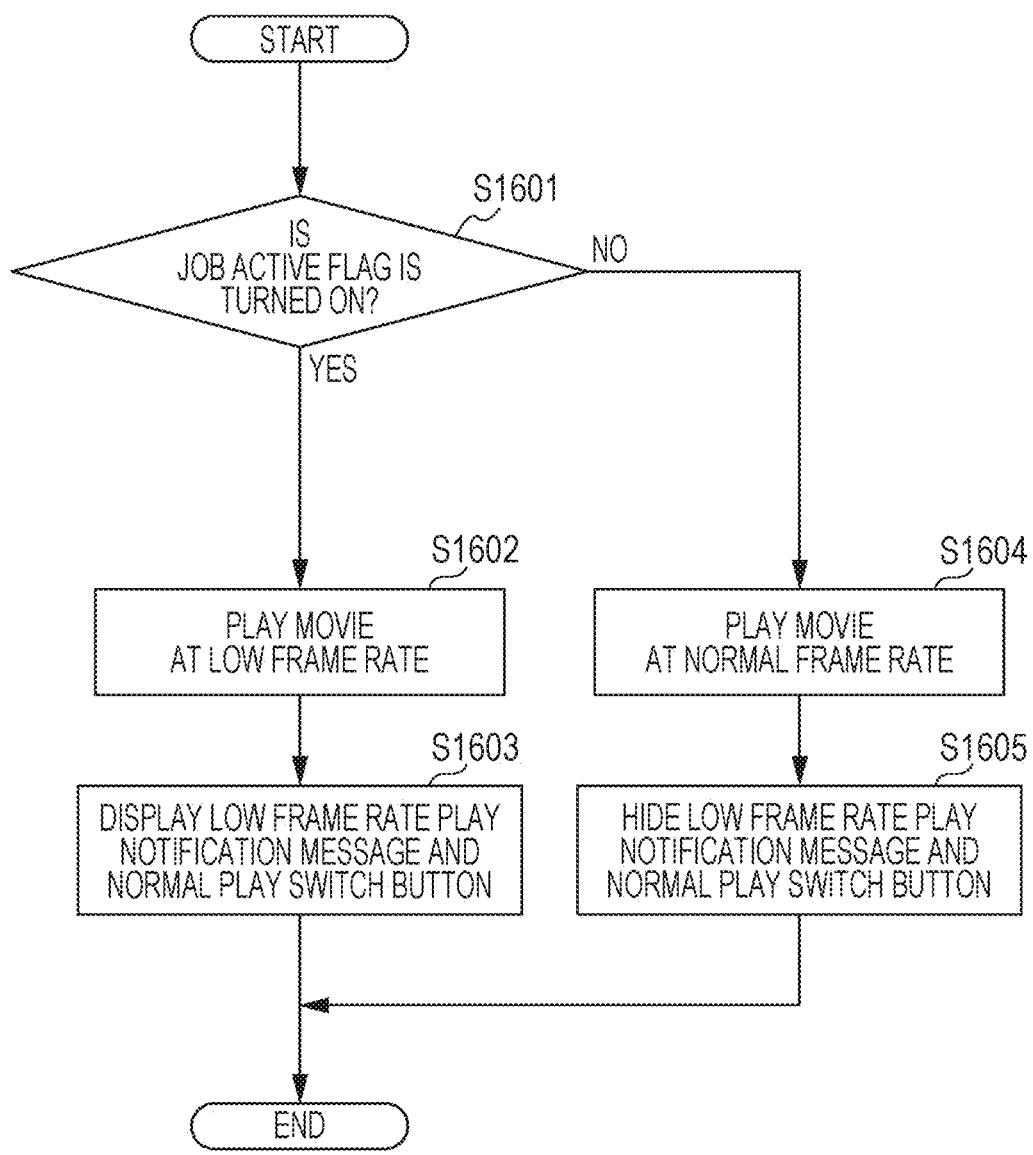
FIG. 16 is a flow chart illustrating a processing procedure according to the first embodiment.

FIG. 15 is a flow chart illustrating details of the movie play process (S1103, S1104) illustrated in FIG. 11. Therefore the process illustrated in FIG. 16 is performed when the play button, the play mark, or the replay mark is pressed.

First, the CPU 101 determines whether the job active flag stored in the PAR 104 is turned on so as to discriminate the job execution status (S1601).

In a case where it is determined that the job active flag is turned on, the processing flow proceeds to S1602, the CPU 101 loads a frame rate setting value for the low frame rate movie stored in RAM 104 in advance and play a movie by using the frame rate setting value. For example, in a case where the setting value is 3 fps, CPU 101 controls a number of frames to be updated per second to 3 frames and performs the play process.

The CPU 101 outputs the low frame rate play notification message 902 and the normal play switch button 903 to the display device 115 (S1603). Therefore, the screen illustrated in FIG. 9 is displayed.

On the other hand, in a case where it is determined that the job active flag is turned off, the processing flow proceeds to S1604, the CPU 101 loads a frame rate setting value for the normal frame rate movie stored in RAM 104 in advance and play a movie by using the frame rate setting value. For example, in a case where the setting value is 12 fps, CPU 101 controls a number of frames to be updated per second to 12 frames and performs the play process. In that case, the CPU 101 hides the low frame rate play notification message 902 and the normal play switch button 903 displayed in the display device 115.

Although in S1602 and S1604 described above, the frame rate setting value is stored in the RAM 104 in advance, a user may set the frame rate setting value for the normal frame rate movie and the frame rate setting value for the low frame rate movie respectively. Although in S1602 and S1604 described above, CPU 101 performs the play process by using the frame rate setting value, CPU 101 may perform the play process by loading a movie of which the frame rate is adjusted in advance. In other words, a movie of which the frame rate is normal for playing the normal frame rate movie and a movie of which the frame rate is low for playing the low frame rate movie may be stored in the storage 111 in advance, and the CPU 101 reads out the movie stored in the storage 111 based on state of the job active flag. Although in the present embodiment, the CPU 101 changes the frame rate of the movie being played when the play button, the play mark, or the replay mark is pressed, the CPU 101 may change the frame rate when the playing position is moved by dragging the slider.

Figure 17:
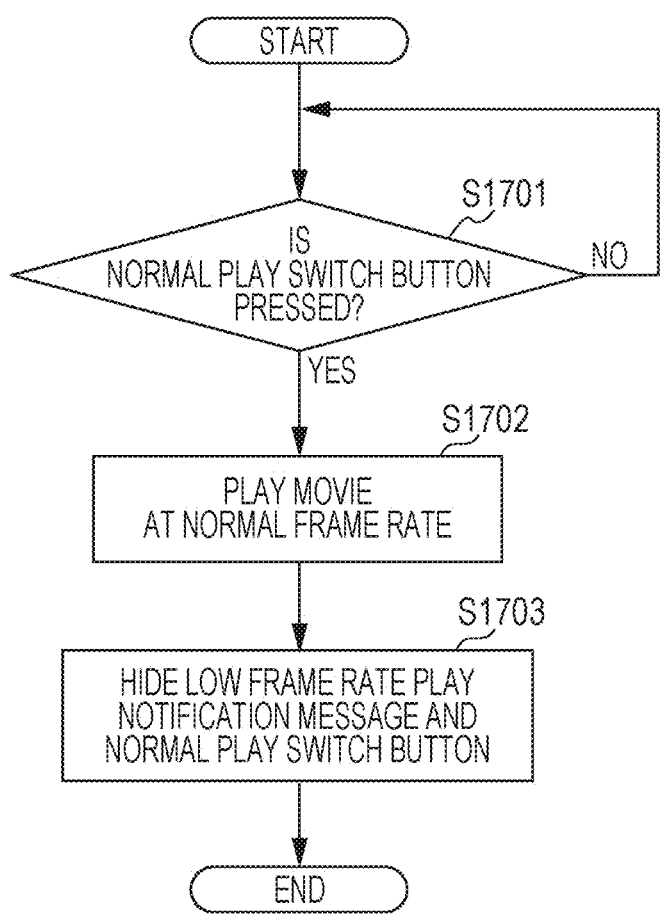
FIG. 17 is a flow chart illustrating a processing procedure according to the first embodiment.

FIG. 17 is a flow chart illustrating a processing procedure performed when the normal play switch button 903 is pressed in a state in which the movie representing the maintenance procedure is being played at low frame rate.

The CPU 101 determines whether the normal play switch button 903 is pressed (S1701), In a case where it is determined that the normal play switch button 903 is pressed, the processing flow proceeds to S1702, the CPU 101 reads put the frame rate setting value for the normal frame rate movie stored in RAM 104 in advance and play a movie by using the frame rate setting value.

Next, the CPU 101 hides the low frame rate play notification message 902 and the normal play switch button 903 displayed in the display device 115, and ends the process.

In the present embodiment, in a case where the job is started in a state in which the movie representing the maintenance procedure is being played, the image processing apparatus switches to play the low frame rate movie at the timing of the operation of the screen by a user, without switching to play the low frame rate movie as soon as the job is stated. Thus, it is possible to prevent a movie viewed by a user from being switched to play the low frame rate movie suddenly, and to reduce the processing load of CPU. Furthermore, the message indicating the low frame rate movie is being played and the button for returning to play the normal frame rate movie are displayed, so it becomes easy for the user to recognize the frame rate of the movie and to give high priority to playing the movie in accordance with the status.

Furthermore, the image processing apparatus returns to play the normal frame rate movie automatically at the timing of the operation of the screen by the user. Thus, it is possible to display user-friendly screen in accordance with the processing load of the CPU.

Second Embodiment

A second embodiment of the invention is described below with a focus on a difference from the first embodiment. In the first embodiment, the frame rate is changed at the timing of press of the play button (or the play mark, etc.) by a user (S1101 in FIG. 10). In other words, the control of the frame rate is performs when the play button (or the play mark, etc.) is pressed after the playing of the movie is stopped and held in the pause state, regardless of the pause button having been pressed (S1201 in FIG. 12) or the playing position having reached the position of chapter. However, the change of the frame rate during one sub-movie being played may give the user a feeling of strangeness. Thus, in the present embodiment, a case will be described in which the frame rate of the movie is changed only when the play button (or the play mark, etc.) is pressed after the playing of the movie is stopped and held in the pause state because of the playing position having reached to the position of chapter.

Figure 18:
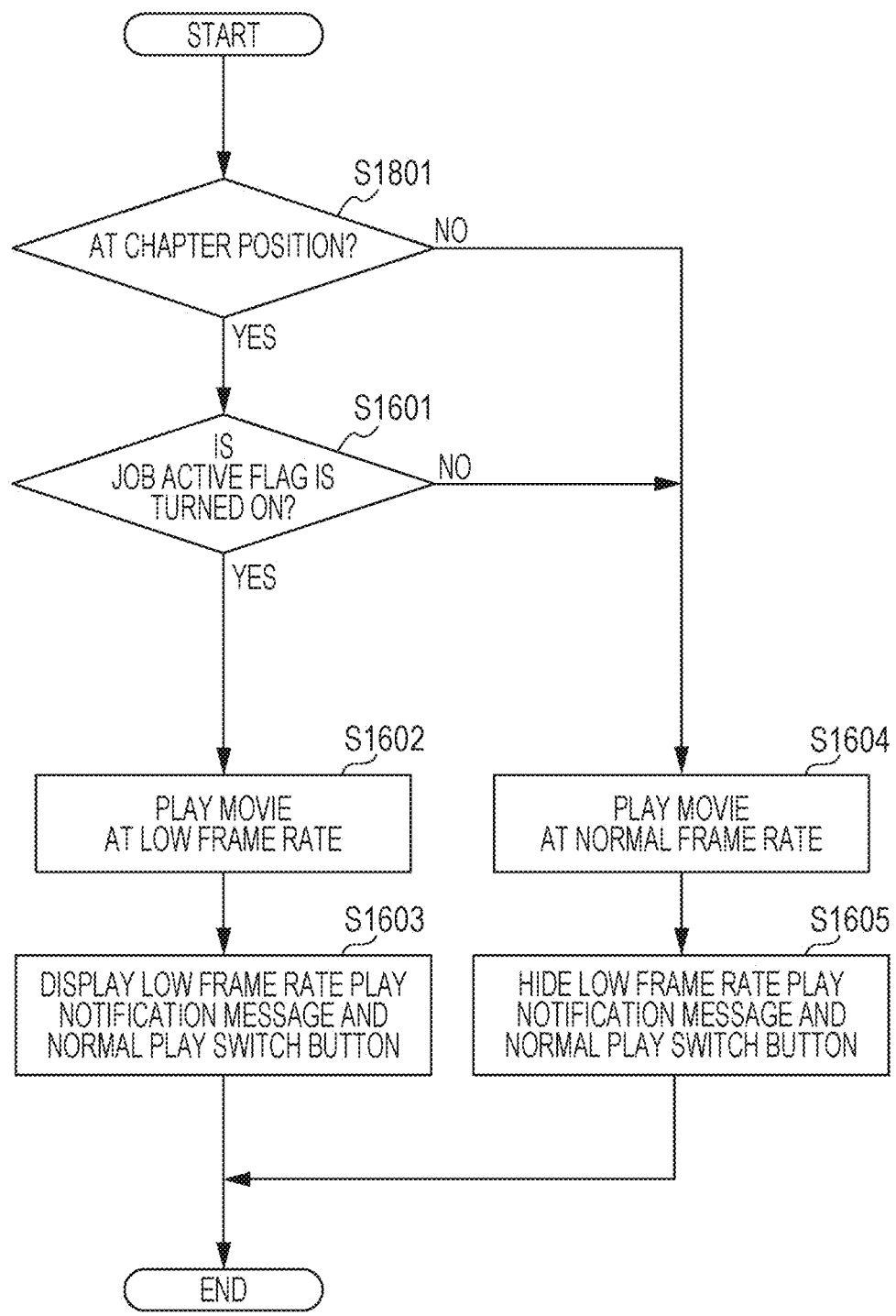
FIG. 18 is a flow chart illustrating a processing procedure according to the second embodiment.

FIG. 18 is a flow chart illustrating details of the movie play process (S1103, S1104) illustrated in FIG. 11. Therefore the process illustrated in FIG. 18 is performed when the play button or the play mark is pressed.

The CPU 101 determines whether the playing position of the movie is at a position corresponding to one of chapter marks (S1801). Note that the chapter marks are at boundaries between sub-movies, and the beginning and the end of the total movie are not included in the chapter mark positions. In a case where it is determined that the playing position of the movie is at one of chapter mark positions, the CPU 101 advances the process to S1601 and performs the process described in FIG. 16. In other words, the frame rate of the movie is controlled based on a check result of job active flag when the sub-movies are switched.

On the other hand, in a case where the playing position of the movie is not at one of chapter mark positions (No in S1801), the CPU 101 plays the normal frame rate movie without checking the job active flag (S1604, S1605)

In the present embodiment, the image processing apparatus plays a movie at a frame rate corresponding to the discrimination result of the job execution status at the timing of switch of the sub-movies. Thus, it is possible to change the frame rate without giving the user the feeling of strangeness, and to reduce the processing load of the CPU.

Third Embodiment

A third embodiment of the invention is described below with a focus on a difference from the first and second embodiment. In the first and second embodiment, the playing of the movie is stopped and held in the pause state at the timing of switch of the sub-movies, that is, the playing of the movie is stopped and held in the pause state at one of chapter mark positions (S1205, S1202). In the present embodiments, a case will be described in which the playing of the movie is not stopped and held in the pause state at the timing of switch of the sub-movies, that is, the plurality of sub-movies are automatically played in succession with absence of a user operation for pausing the movie. In this case, the determination process of S1205 (FIG. 12) is skipped.

Figure 19:
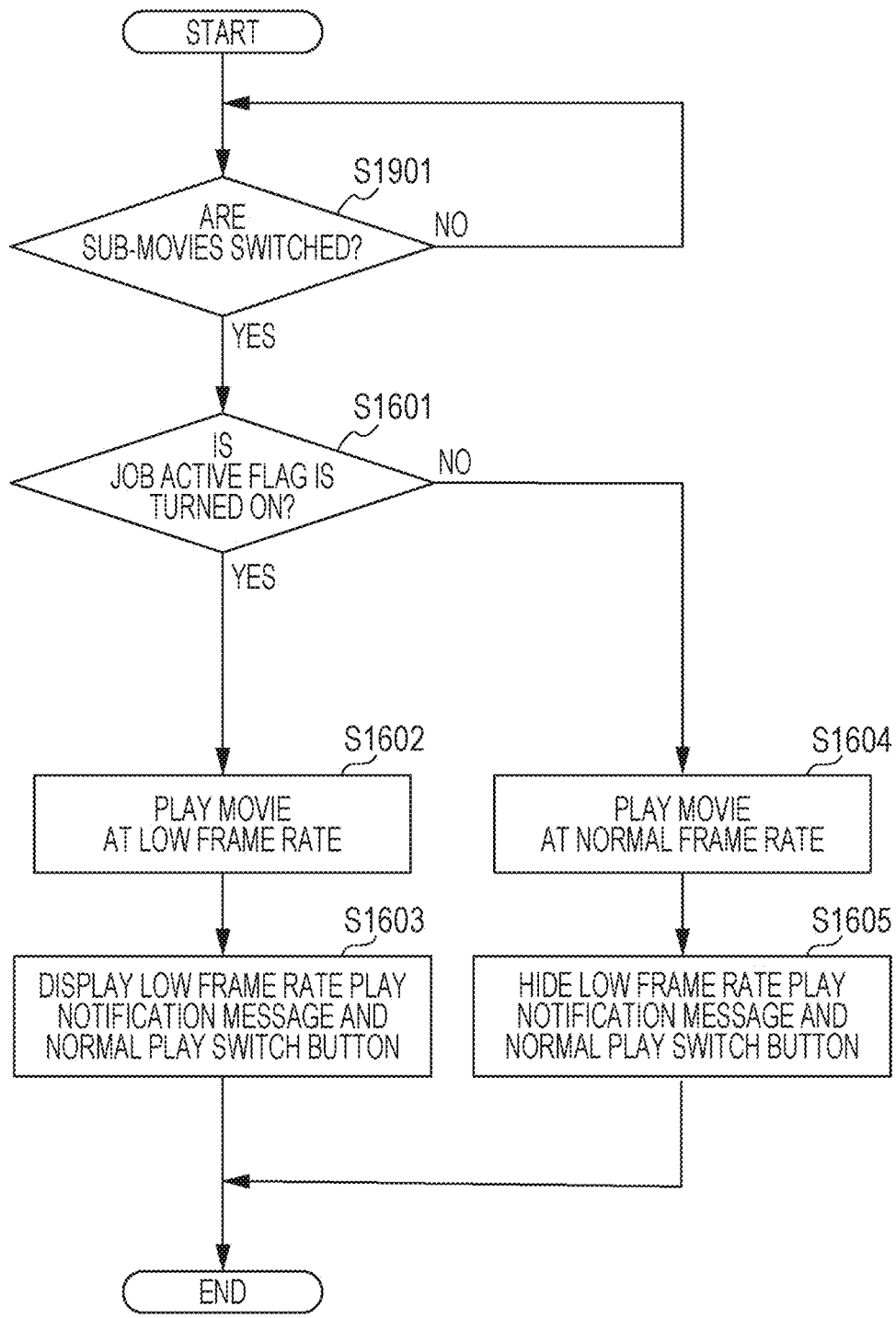
FIG. 19 is a flow chart illustrating a processing procedure according to the third embodiment.

FIG. 19 is a flow chart illustrating a processing procedure performed when the sub-movies are switched.

The CPU 101 determines whether it is timing to switch the sub-movies (S1901). In a case where it is timing to switch the sub-movies, the CPU 101 advances the process to S1601 and performs the process described in FIG. 16.

In the present embodiment, even when the plurality of sub-movies representing the maintenance procedure are played in succession, it is possible to control the frame rate in accordance with the job execution status at the timing of switch of the sub-movies, and to reduce the processing load of the CPU.

Fourth Embodiment

A fourth embodiment of the invention is described below with a focus on a difference from the first to third embodiment. In the first to third embodiment, the frame rate of the movie for presenting maintenance procedure is changed in accordance with the job execution status. In the present embodiment, an illustration for presenting maintenance procedure is displayed instead of playing the low frame rate movie.

In this case, a process described below is performed instead of the process described in S1602 of FIG. 16, FIG. 18, or FIG. 19. In S1602, CPU 101 hides the movie and loads an illustration of a guidance corresponding to maintenance ID stored in the storage 111 based on the movie list table 400 in FIG. 4A and the movie table 410 in FIG. 4B and outputs it to the display device 115. For example, in a case where the maintenance ID is 001, CPU 101 loads /image/A1.png corresponding to the sub-movie A1, /image/A2.png corresponding to the sub-movie A2, and /image/A4.png corresponding to the sub-movie A4 based on the movie list 402 and the illustration file 416 and output it.

Figure 20:
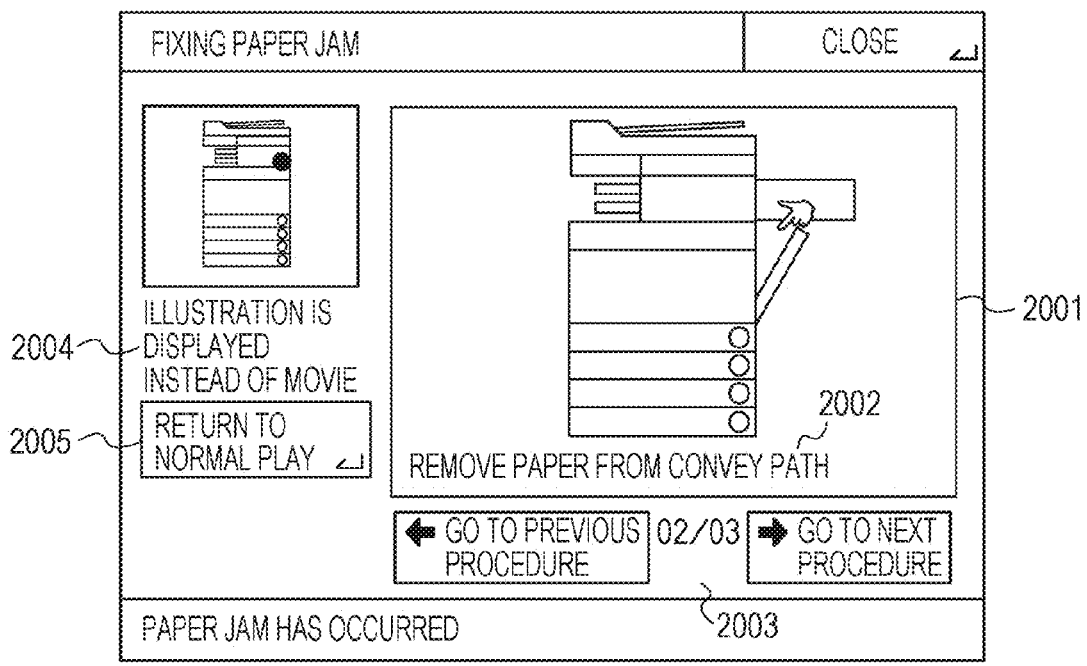
FIG. 20 is a diagram illustrating examples of screen of a display device according to the fourth embodiment.

FIG. 20 illustrates an example of a screen displayed when the illustration for presenting maintenance procedure is displayed.

An illustration guidance 2001 represents an illustration for presenting maintenance procedure. A message 2002 represents descriptive text which supplements the illustration guidance 2001. The message 2002 may be the same in content as the message 415 in FIG. 4 and different message for illustration guidance. An illustration switch button 2003 is a button used to issue a command to switch a display of the illustration guidance 2001 to an illustration for presenting next procedure or previous procedure. An illustration display notification message 2004 represents a message indicating the illustration is being displayed. A normal play switch button 2005 is a button used to issue a command to switch from displaying the illustration to playing the normal frame rate movie.

In the present embodiment, it is possible to reduce the processing load of the CPU and to give high priority to processing the job by displaying the illustration guidance instead of the movie.

Other Embodiments

In the embodiments described above, it is assumed by way of example that the image forming apparatus 100 has a plurality of functions such as a copying function, a copying function, and the like. There is no particular restriction on the functions of the image forming apparatus 100, and the image processing apparatus may have part of the functions described above. The embodiments may be applied to other types of information processing apparatuses such as a personal computer, a PDA device, a portable telephone device, a facsimile device, a camera, a video camera, an image viewer, or the like.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blue-ray Disc (BD)™), a flash memory device, a memory card, and the like. While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-248033, filed Nov. 29, 2013, which is hereby incorporated by reference herein in its entirety.

What is claimed is:

1. An apparatus for playing a plurality of sub-movies sequentially as a single movie, the sub-movies respectively representing operations to be performed to make maintenance on the apparatus; the apparatus comprising:
    a first playing unit configured to play the movie using a first frame rate;
    a second playing unit configured to play the movie using a second frame rate which is lower than the first frame rate;
    a discrimination unit configured to discriminate a job execution status; and
    a control unit configured to control, when an instruction for playing the movie is issued after the playing of the movie by the first playing unit or the second playing unit is paused, to change between playing the movie by the first playing unit and playing the movie by the second playing unit based on the discriminated job execution status at a timing of change of the sub-movies.

2. The apparatus according to claim 1, wherein the control unit controls to play the movie by the second playing unit in a case where the discrimination unit discriminates that the job is being executed, and to play the movie by the first playing unit in a case where the discrimination unit discriminates that the job is not being executed.

3. The apparatus according to claim 1, further comprising a determination unit configured to determine whether to change the sub-movies to be played when the instruction for playing the movie is issued,
wherein the control unit controls to play the movie by the second playing unit based on the discrimination result discriminated by the discrimination unit in a case where the determination unit determines to change the sub-movies, and to play the movie by the first playing unit in a case where the determination unit determines not to change the sub-movies.

4. The image forming apparatus according to claim 1, further comprising a notification unit configured to notify a user of the movie being played by the second frame rate in a case where the movie is played by the second playing unit.

5. The apparatus according to claim 1, further comprising a display unit configured to display a button for instructing to change to play the movie by the first playing unit when the movie is played by the second playing unit.

6. The apparatus according to claim 1, further comprising:
a storage unit configured to store a combination of a plurality of sub-movies in relation to a corresponding one of a plurality of maintenance events; and
a detection unit configured to detect an occurrence of a maintenance event,
wherein the first playing unit and the second playing unit acquire a plurality of sub-movies related to the maintenance event based on the stored information stored, and play the acquired sub-movies as a single movie.

7. The apparatus according to claim 6, wherein
the storage unit stores a playing order of sub-movies together with a combination of the plurality of sub-movies, and
the first playing unit and the second playing unit acquire a plurality of sub-movies related to the detected maintenance event and play the acquired sub-movies according to the playing order as a single movie.

8. The apparatus according to claim 1, wherein
the plurality of sub-movies include a preparation procedure movie representing an operation to be performed before an operation for solving a maintenance event is performed, and a main procedure movie representing an operation to be performed after the operation represented by the preparation procedure movie is performed.

9. An apparatus for playing a plurality of sub-movies sequentially as a single movie, the sub-movies respectively representing operations to be performed to make maintenance on the apparatus; the apparatus comprising:
a first playing unit configured to play the movie at a first frame rate;
a second playing unit configured to play the movie at a second frame rate which is lower than the first frame rate;
a discrimination unit configured to discriminate a job execution status; and
a control unit configured to control, when the sub-movies in the movie being played by the first playing unit or the second playing unit are changed, to change between playing the movie by the first playing unit and playing the movie by the second playing unit based on the discriminated job execution status at a timing of change of the sub-movies.

10. A method of controlling an apparatus for playing a plurality of sub-movies sequentially as a single movie, the sub-movies respectively representing operations to be performed to make maintenance on the apparatus, the method comprising:
playing the movie using a first frame rate;
playing the movie using a second frame rate which is lower than the first frame rate;
discriminating a job execution status; and
controlling, when an instruction for playing the movie is issued after the playing of the movie is paused, to change between playing the movie using the first frame rate and playing the movie using the second frame rate based on the discriminated job execution status at a timing of change of the sub-movies.

11. The method according to claim 10, wherein the controlling controls to play the movie using the second frame rate in a case where the discriminating discriminates that the job is being executed, and to play the movie using a first frame rate in a case where the discriminating discriminates that the job is not being executed.

12. The method according to claim 10, further comprising:
determining whether to change the sub-movies to be played when the instruction for playing the movie is issued,
wherein the controlling controls to play the movie in the second frame rate based on the discrimination result discriminated by the discriminating in a case where the determining determines to change the sub-movies, and to play the movie in a first frame rate in a case where the determining determines not to change the sub-movies.

13. The method according to claim 10, further comprising notifying a user of the movie being played by the second frame rate in a case where the movie is played in the second frame rate.

14. The method according to claim 10, further comprising displaying a button for instructing to change the movie played in the first frame rate when the movie is played in the second frame rate.

15. A method of controlling an apparatus for playing a plurality of sub-movies sequentially as a single movie, the sub-movies respectively representing operations to be performed to make maintenance on the apparatus, the method comprising:
playing the movie using a first frame rate;
playing the movie using a second frame rate which is lower than the first frame rate;
discriminating a job execution status; and
controlling, when the sub-movies in the movie being played are changed, to change between playing the movie using the first frame rate and playing the movie using the second frame rate based on the discriminated job execution status at a timing of change of the sub-movies.

16. A non-transitory computer-readable storage medium storing a computer program configured to control a computer to execute a control method of controlling an apparatus for playing a plurality of sub-movies sequentially as a single movie, the sub-movies respectively representing operations to be performed to make maintenance on the apparatus, the method comprising:
playing the movie using a first frame rate;

playing the movie using a second frame rate which is lower than the first frame rate;

discriminating a job execution status; and controlling, when an instruction for playing the movie is issued after the playing of the movie is paused, to change between playing the movie using the first frame rate and playing the movie using the second frame rate based on the discriminated job execution status at a timing of change of the sub-movies.

17. The non-transitory computer-readable storage medium according to claim 16, wherein the controlling controls to play the movie using the second frame rate in a case where the discriminating discriminates that the job is being executed, and to play the movie using a first frame rate in a case where the discriminating discriminates that the job is not being executed.

18. The non-transitory computer-readable storage medium according to claim 16, further comprising:

determining whether to change the sub-movies to be played when the instruction for playing the movie is issued, wherein the controlling controls to play the movie in the second frame rate based on the discrimination result discriminated by the discriminating in a case where the determining determines to change the sub-movies, and to play the movie in a first frame rate in a case where the determining determines not to change the sub-movies.

19. The non-transitory computer-readable storage medium according to claim 16, further comprising notifying a user of the movie being played by the second frame rate in a case where the movie is played in the second frame rate.

20. A non-transitory computer-readable storage medium storing a computer program configured to control a computer to execute a control method of controlling an apparatus for playing a plurality of sub-movies sequentially as a single movie, the sub-movies respectively representing operations to be performed to make maintenance on the apparatus, the method comprising:

playing the movie using a first frame rate;

playing the movie using a second frame rate which is lower than the first frame rate;

discriminating a job execution status; and controlling, when the sub-movies in the movie being played are changed, to change between playing the movie using the first frame rate and playing the movie using the second frame rate based on the discriminated job execution status at a timing of change of the sub-movies.

* * * * *